US008113840B2

(12) United States Patent  (10) Patent No.: US 8,113,840 B2
Kuhn  (45) Date of Patent: Feb. 14, 2012

(54) METHOD AND APPARATUS FOR AN ARCHITECTURAL DESIGN AID SYSTEM

(75) Inventor: Michael H. Kuhn, New York, NY (US)

(73) Assignee: SnapHouse, LLC, New York, NY (US)

( * ) Notice: Subject to any disclaimer, the term of this patent is extended or adjusted under 35 U.S.C. 154(b) by 23 days.

(21) Appl. No.: 12/009,788

(22) Filed: Jan. 22, 2008

(65) Prior Publication Data

US 2008/0187889 A1   Aug. 7, 2008

Related U.S. Application Data

(60) Provisional application No. 60/881,665, filed on Jan. 22, 2007.

(51) Int. Cl.
G09B 25/00 (2006.01)
(52) U.S. Cl. .......................................... 434/72
(58) Field of Classification Search .................. 434/72, 434/74, 79, 80; 446/108, 110–116
See application file for complete search history.

(56) References Cited

U.S. PATENT DOCUMENTS

| | | | | |
|---|---|---|---|---|
| 597,519 | A * | 1/1898 | De Souchet | 446/124 |
| 1,150,363 | A * | 8/1915 | Haskins | 446/112 |
| 1,449,519 | A * | 3/1923 | Layton | 434/72 |
| 2,107,691 | A * | 2/1938 | Corser | 446/122 |
| 2,150,707 | A * | 3/1939 | Lawrence | 446/124 |
| 2,708,329 | A * | 5/1955 | McKee | 52/286 |
| 3,161,986 | A * | 12/1964 | Stubbmann et al. | 446/115 |
| 3,295,225 | A * | 1/1967 | Sodergren | 434/72 |
| 3,303,581 | A * | 2/1967 | Levinson | 434/72 |
| 3,594,940 | A * | 7/1971 | Yonezawa | 446/118 |
| 3,902,291 | A * | 9/1975 | Zucht | 52/284 |
| 3,936,989 | A | 2/1976 | Hancock | |
| 4,031,678 | A | 6/1977 | Schuring | |
| 4,126,979 | A | 11/1978 | Hancock | |
| 4,185,434 | A | 1/1980 | Jones | |
| 4,219,960 | A * | 9/1980 | Walmer et al. | 446/110 |
| 4,301,637 | A | 11/1981 | Anderson | |
| 4,317,306 | A | 3/1982 | Hotti | |
| 4,335,553 | A | 6/1982 | Gould | |
| 4,365,454 | A * | 12/1982 | Davis | 52/578 |
| 4,381,619 | A | 5/1983 | Griffin | |
| 4,473,985 | A | 10/1984 | Hunt | |
| 4,593,513 | A | 6/1986 | Stratton | |
| 4,614,071 | A | 9/1986 | Sams et al. | |
| 4,650,437 | A * | 3/1987 | Sitkus | 446/128 |
| 6,073,404 | A * | 6/2000 | Norfleet | 52/236.3 |
| 6,074,211 | A * | 6/2000 | Reid | 434/81 |
| 6,283,818 | B1 * | 9/2001 | Kushner et al. | 446/476 |

(Continued)

*Primary Examiner* — Kurt Fernstrom

(74) *Attorney, Agent, or Firm* — John J. Skinner, Jr.; Michelman & Robinson LLP

(57) ABSTRACT

A simplified and user-friendly reusable modular building block system, for use by the professional architect or home design enthusiast, allowing for the creation of custom architectural scale models of building designs similar in appearance and function to professional scale models produced in architects' offices is presented. The building block system pieces are comprised of interlocking injection-molded solid plastic parts and grouped in five classes of various corresponding shapes and sizes. The construction and grouping of the block system pieces can be connected together at the user's discretion in a limitless variety of creative configurations, thereby forming the walls, floors, ceilings, roofs, door and window openings, and other building design elements of an architectural model at 1:48 scale (¼"=1'0") based on the user's unique house design, or an existing design if so desired.

15 Claims, 22 Drawing Sheets

U.S. PATENT DOCUMENTS

| | | |
|---|---|---|
| 6,450,853 B1 | 9/2002 | Larws |
| 6,500,007 B2 * | 12/2002 | Pupulin ......................... 434/171 |
| 6,641,452 B2 | 11/2003 | Racine |
| 6,645,032 B2 * | 11/2003 | Barringer et al. ............. 446/108 |
| 6,974,324 B1 * | 12/2005 | Gregoire et al. ................ 434/72 |
| 7,007,436 B1 | 3/2006 | Kelly |
| 7,021,938 B2 * | 4/2006 | Cain ............................... 434/72 |
| 7,108,577 B2 | 9/2006 | Peters et al. |
| 7,186,161 B2 * | 3/2007 | Salas Peralta ................ 446/108 |
| 7,581,357 B2 * | 9/2009 | Richardson et al. ........... 52/79.5 |
| 2002/0193046 A1 * | 12/2002 | Zebersky ...................... 446/476 |
| 2004/0224289 A1 * | 11/2004 | Brown ............................ 434/72 |

* cited by examiner

Sample Elevation View (a)

Sample Plan View (b)

Sample Elevation View (a)

Sample Plan View (b)

Sample Elevation View (a)

Sample Plan View (b)

Sample Isometric View (a)

Sample Elevation View (b)

Sample Plan View (c)

Sample Elevation View (a)

Sample Plan View (b)

Sample Elevation View (a)

Sample Plan View (b)

Sample Elevation View (a)

Sample Plan View (b)

Sample Isometric View (a)

Sample Elevation View (b)

Sample Plan View (c)

Sample Isometric View (a)

Sample Elevation View (b)

Sample Plan View (c)

Sample Isometric View (a)

Sample Elevation View (b)

Sample Plan View (c)

Sample Isometric View (a)

Sample Elevation View (b)

Sample Plan View (2-Story Room)

(c)

Sample Isometric View (a)

Sample Elevation View (b)

Sample Plan View (2-Story Room)

(c)

Sample Isometric View (a)

Sample Elevation View (b)

Sample Plan View (c)

Sample Isometric View (a)

Sample Elevation View (b)

Sample Plan View (Terrace Low Wall)

(c)

Sample Isometric View (a)

Sample Elevation View (b)

Sample Plan View (Columns on Porch)

(c)

Sample Isometric View (a)

Sample Elevation View (b)

Sample Plan View (Porch with 3 columns)

(c)

Sample Isometric View (a)

Sample Elevation View (b)

Sample Plan View (c)

METHOD AND APPARATUS FOR AN ARCHITECTURAL DESIGN AID SYSTEM

PRIOR PROVISIONAL PATENT APPLICATION

The present application claims the benefit of U.S. Provisional Application No. 60/881,665 filed Jan. 22, 2007, the disclosure of which is hereby incorporated by reference.

FIELD OF THE INVENTION

The present invention is directed to a method and apparatus for an architectural design aid system, and more particularly, to a method and apparatus for a scale model building block system consisting of different classes of dimensional parts to aid in the development and design of architectural plans.

BACKGROUND OF THE INVENTION

With the recent and ever-increasing interest in architecture and home design among the general public, many non-professional architecture and home design enthusiasts are engaging in activities that provide them with more access to home design-focused information, learning and experiential interaction. For example, the popularity and success of design-focused media properties such as Dwell and Surface magazines, HGTV and TLC television networks, and the plethora of home design software applications and online house plan resellers all attest to the growing desire among design enthusiasts to engage in activities that unlock and empower their inner architect. For many people, designing their dream home is a life-long passion, whether the end result is a purely aspirational pursuit or an actual planned objective.

For these people, architectural scale models would be extremely useful in the planning and design of buildings, room layouts, decorating schemes, and the like, because they give physical and visual three-dimensional impressions of prospective full-scale structures. They can also facilitate the creative design process by enabling the designer to portray various layouts and design schemes in order to adjust and fine-tune their vision into a final shape and form.

For these reasons professional architects often create custom architectural scale models in order to effectively present their designs to clients. Architects utilize a variety of materials, including foam board, mat board, balsa wood and basswood, to construct their custom models from scratch and by hand. However, the materials and processes involved in constructing these custom models require a significant level of skill, time, and expense, and are not suitable or realistic methods for enthusiasts to attempt creating models of their own designs, nor would they provide what needs to be a user-friendly and timesaving experience.

It is clear then that the impressions and visual impact made possible with three-dimensional physical scale models cannot be achieved to the same extent and effectiveness with hand-drafted blueprint and computer-generated renderings.

Indeed, while pencil and paper facilitate two-dimensional drafting of floor plans and elevations and computer software applications enable three-dimensional renderings on screen, neither provides the enthusiast with the tools to easily create a physical architectural scale model with accurate wall thickness, ceiling heights, roof angles, door and window openings, and other architectural design elements that can be touched, studied and displayed.

For instance, with regard to a computer software application disclosed in U.S. Pat. No. 5,975,908, issued Nov. 2, 1999 to A. Hulten, a method for constructing a physical scale model of a structure utilizing a computer is presented. However, multiple time consuming steps must be taken before the architect or designer is able to begin construction of the scale model. Indeed, views of the interior and exterior walls of the structure must first be printed out on adhesive-backed paper, the pieces of paper bearing the printed views of the structure must then be affixed to pieces of rigid stock such as cardboard or foam core to create walls, and then cutting or trimming the pieces as necessary must be accomplished.

The same holds true to a computer software application disclosed in U.S. Pat. Nos. 6,404,424 and 6,556,211, issued Jun. 11, 2002 and Apr. 29, 2003, respectively, both to S. Davis. Herein again a method for constructing a physical scale model of a structure utilizing a computer is presented. Here too multiple time consuming steps must be taken before the architect or designer is able to begin construction of the scale model. In these patents, templates for component parts must first be printed out, trimmed, and then affixed to suitable model-making materials. Only then can the three-dimensional scale model be constructed.

Thus it is clear that the one form of design-focused activity that currently is not easily accessible to the architecture and home design enthusiast without multiple time consuming intermediary steps is the creation of architectural scale models. No product currently exists in the consumer markets that provides the adult architecture and home design enthusiast with a simplified and efficient modular building block system to create custom architectural scale models of their own dream-house designs similar in appearance to professional scale models produced in architects' offices.

Alternatively, it should be noted, numerous manufacturers of toy and craft items have developed modular construction systems expressly for children with building elements of various shapes and sizes, including: standard building blocks; "Erector Set" brand of beam and connector elements; "Lincoln Log" brand of interlocking wooden log-shaped components; "Archiblocks" brand building system of stacking wooden blocks produced in a range of architectural styles; and "Lego" brand of variable connectable plastic solids. However, none of these currently existing construction toy and craft items utilize a system that appropriately provides the adult architecture and home design enthusiast with the ability to create free-form structures based on their own house designs that are accurately portrayed at the common architectural scale of ¼"=1'-0", and similar in appearance and function to professionally-constructed architectural scale models. Thus, none of these items are useful to the enthusiast's planning and design objectives because they do not accurately give identifiable physical and visual three-dimensional impressions of prospective full-scale structures.

SUMMARY OF THE INVENTION

Accordingly, the present invention is directed to providing a complete set of tools that allows the user to construct custom architectural scale models of their own house designs or existing designs similar in appearance and function to professional scale models produced in architects' offices.

The primary component of the present invention is a reusable modular building block system that provides a number of interlocking injection-molded solid plastic pieces in various shapes and sizes that are capable of combining together to form three-dimensional architectural models.

The pieces of the building block system are classified into five distinct classes, each class being based on similarities in shape, size and/or function. The classes of the pieces are: "panels", "openings", "inserts", "connectors" and "details".

The classification system for the part pieces provide the ability for the user to easily create an architectural scale model at 1:48 scale based on a unique or existing house design.

The part pieces snap together with a precise fit that provides a flush surface between two parts connected together with an interlocking design based on a tongue-and-groove format. The pieces can be disconnected and reconnected at will and therefore reused repeatedly in a limitless variety of connection schemes.

The present invention, including its features and advantages, will become more apparent from the following detailed description with reference to the accompanying drawings.

DETAILED DESCRIPTION

FIGS. 1 through 5 show the various embodiments of scale model pieces as divided into the differing piece classifications system, while FIGS. 6 through 22 show how each piece in the classification system fits with others and how they may be utilized in the construction of a scale model.

To aid in architectural design, the pieces of the architectural design aid system are divided into five classes based on similarities and commonalities with the physical characteristics and intended applications and purposes of the parts. As can be seen, the five classes, and the shapes included in each class, are as follows: "panels", "openings", "inserts", "connectors" and "details".

Each class is made up of parts in varying shapes and corresponding sizes and quantities that achieve any one of the stated purposes for the class when applied properly in the construction of the scale model. The varying sizes provided for each unique shape and quantities provided for each part in the building block system have been determined from extensive analysis of both existing and custom house designs, and testing of the invention prototypes.

Figure 1:
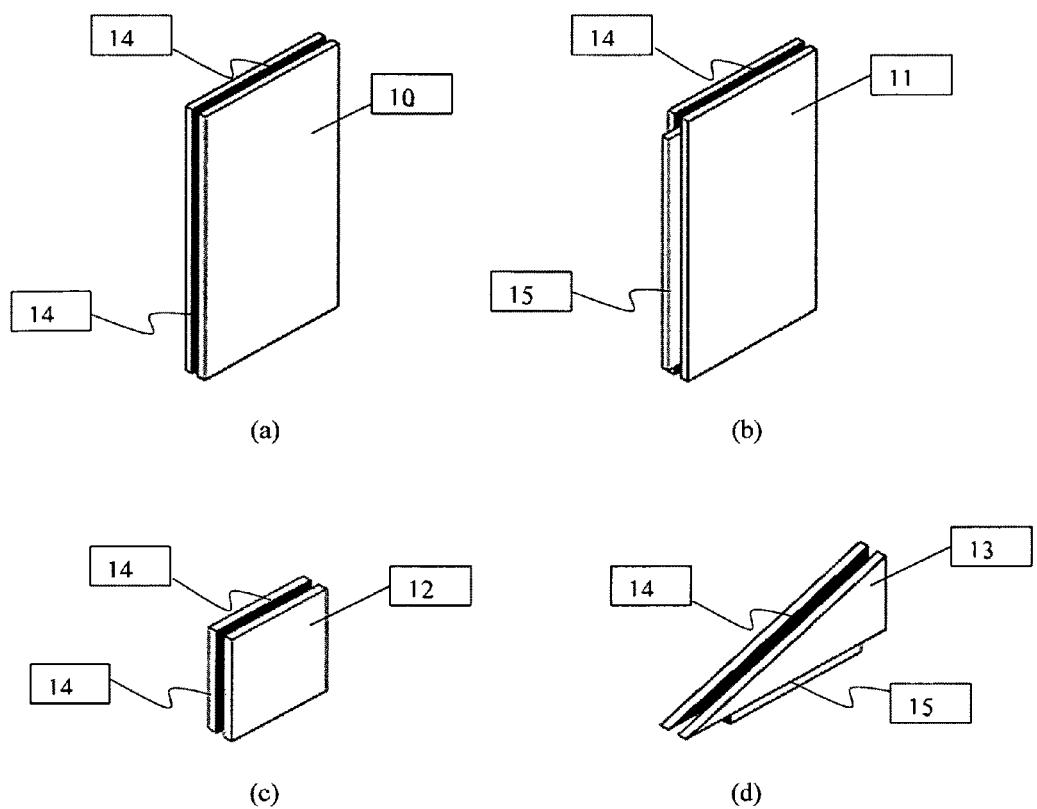
FIG. 1 is an illustration of an isometric perspective view of various architectural building component pieces (a-d) as grouped in a first class referred to as "panels", according to an embodiment of the present invention.

Referring now to FIG. 1, the first class of pieces in the architectural design aid classification system, that is, the "panels", are shown. The "panels" consist of rectangular and triangular solid panels with no openings or cutouts and are applied in the scale models as wall, gable, floor, or roof sections.

Preferably, the "panels" pieces consist of the following:

| PIECE DESCRIPTION | ACTUAL DIMENSION | SCALE DIMENSION | CONNECTIONS |
| --- | --- | --- | --- |
| 18" solid rectangular Wall/Floor/Roof section | .375" (w) × 2.25" (h) × .19" (d) | 18" (w) × 9' (h) × 9" (d) | Female only |
| 18" solid rectangular Wall/Floor/Roof section | .375" (w) × 2.25" (h) × .19" (d) | 18" (w) × 9' (h) × 9" (d) | Male & Female |
| 2' solid rectangular Wall/Floor/Roof section | .5" (w) × 2.25" (h) × .19" (d) | 2' (w) × 9' (h) × 9" (d) | Female only |
| 2' solid rectangular Wall/Floor/Roof section | .5" (w) × 2.25" (h) × .19" (d) | 2' (w) × 9' (h) × 9" (d) | Male & Female |
| 3' solid rectangular Wall/Floor/Roof section | .75" (w) × 2.25" (h) × .19" (d) | 3' (w) × 9' (h) × 9" (d) | Female only |
| 3' solid rectangular Wall/Floor/Roof section | .75" (w) × 2.25" (h) × .19" (d) | 3' (w) × 9' (h) × 9" (d) | Male & Female |
| 4' solid rectangular Wall/Floor/Roof section | 1" (w) × 2.25" (h) × .19" (d) | 4' (w) × 9' (h) × 9" (d) | Female only |
| 4' solid rectangular Wall/Floor/Roof section | 1" (w) × 2.25" (h) × .19" (d) | 4' (w) × 9' (h) × 9" (d) | Male & Female |
| 6' solid rectangular Wall/Floor/Roof section | 1.5" (w) × 2.25" (h) × .19" (d) | 6' (w) × 9' (h) × 9" (d) | Female only |
| 6' solid rectangular Wall/Floor/Roof section | 1.5" (w) × 2.25" (h) × .19" (d) | 6' (w) × 9' (h) × 9" (d) | Male & Female |
| 8' solid rectangular Wall/Floor/Roof section | 2" (w) × 2.25" (h) × .19" (d) | 8' (w) × 9' (h) × 9" (d) | Female only |
| 8' solid rectangular Wall/Floor/Roof section | 2" (w) × 2.25" (h) × .19" (d) | 8' (w) × 9' (h) × 9" (d) | Male & Female |
| 12' solid rectangular Wall/Floor/Roof section | 3" (w) × 2.25" (h) × .19" (d) | 12' (w) × 9' (h) × 9" (d) | Female only |
| 12' solid rectangular Wall/Floor/Roof section | 3" (w) × 2.25" (h) × .19" (d) | 12' (w) × 9' (h) × 9" (d) | Male & Female |
| solid rectangular Low Wall section | .75" (w) × .75" (h) × .19" (d) | 3' (w) × 3' (h) × 9" (d) | Female only |

-continued

| PIECE DESCRIPTION | ACTUAL DIMENSION | SCALE DIMENSION | CONNECTIONS |
|---|---|---|---|
| solid rectangular Low Wall section | .75" (w) × .75" (h) × .19" (d) | 3' (w) × 3' (h) × 9" (d) | Male & Female |
| solid triangular vertical Gable section | 1.5" (w) × .5" (h) × .19" (d) | 6' (w) × 2' (h) × 9" (d) | Male & Female |

In the above (and below) chart(s), the actual dimension refers to the actual physical size of the part piece as it can be manufactured, while the scale dimension refers to the real architectural size of the piece the scale model piece is intended to portray. The scale for such measurements is at a 1:48 scale (¼"=1'-0"). Thus, for instance, each of the parts contained in the "panel", "opening" and "insert" classes charts have a depth (thickness) of 3/16", thereby representing a 9" thick building section at. It should also be noted that the dimensions of the finished manufactured scale model pieces may vary slightly from that shown in the charts.

As can be seen from the above chart, each of the shapes and sizes of the pieces within the "Panels" class (with the exception of part pieces labeled "solid rectangular Low Wall section" and "solid triangular vertical Gable section") are provided in two connection formats: one version with both male and female connectors (i.e., tongue on one side, grooves on all other connectable sides); one version with only female connectors (i.e., grooves on all connectable sides). It is to be understood, however, that such connectors may be swapped as desired.

Referring specifically to FIG. 1(a), a solid rectangular Wall/Floor/Roof panel section 10 having four female connectors 14 is shown. Panel section 10 comes in actual dimension widths (i.e., lengths) of 0.375", 0.5", 0.75", 1", 1.5", 2" and 3", corresponding respectively to scale dimensional widths of 18", 2', 3', 4', 6', 8' and 12'. Each piece is preferably 2.25" in height and preferably ranges from 0.1875" to 0.19" in depth. The female (groove) connectors 14 are constructed in actual dimension to be 0.0625" in width and 0.125" in depth. It is to be understood, of course, that the female (groove) connections 14 are to be found at all four edges of section 10, and that they correspondingly connect to pieces with male (tongue) connectors of other pieces in the system.

The applications of panel section 10 are as solid rectangular pieces that may be applied for the following purposes: 1) a Wall section—standing upright in either a vertical or horizontal orientation; 2) a Floor section laying flat; or 3) a Roof section laying flat or at angle (for use with the 4-pitch roof ridge and gable-wall sections described below).

Referring now to FIGS. 6(a) and 6(b), an exterior elevation view and a plan view, respectively, of example applications of panel section 10 are shown. In FIG. 6(a), a scale model 60 has three panel sections 10 being utilized in its construction. In FIG. 6(b), three panel sections 10 are shown interconnected with other system pieces.

Referring back specifically to FIG. 1 (b), a solid rectangular Wall/Floor/Roof panel section 11 having three female connectors 14 and one male connector 15 is shown. Panel section 11 comes in actual dimension widths (i.e., lengths) of 0.375", 0.5", 0.75", 1", 1.5", 2" and 3", corresponding respectively to scale dimensional widths of 18", 2', 3', 4', 6', 8' and 12'. Each piece is preferably 2.25" in height and preferably ranges from 0.1875" to 0.19" in depth.

Preferably, as shown, panel section 11 is constructed having a male (tongue) connector 15 integrally connected along one edge and having female (groove) connections 14 along the three other edges. The male (tongue) connector 15 is constructed to be 0.125" in width and 0.0625" in depth. It is to be understood, of course, that panel section 11 may be constructed having the male connector along the shorter edge, or may be constructed having the male connector along more than one edge. For instance, along two, three or even all four edges.

Like panel section 10, the applications of panel section 11 are as solid rectangular pieces that may be applied for the following purposes: 1) Wall section—standing upright in either vertical or horizontal orientation; 2) Floor section laying flat; or 3) Roof section laying flat or at angle (also for use with the 4-pitch roof ridge and gable-wall sections described below).

Referring now to FIGS. 7(a) and 7(b), an exterior elevation view and a plan view, respectively, of example applications of panel section 11 are shown. In FIG. 7(a), a scale model 70 has two panel sections 11 being utilized in its construction. In FIG. 7(b), two panel sections 11 are shown interconnected with other system pieces.

Referring back specifically to FIG. 1(c), a solid rectangular Low-Wall panel section 12 having four female connectors 14 is shown. Panel section 12 comes in an actual dimensions of 0.75" in width, 0.75" in height and 0.19" in depth, corresponding respectively to scale dimensions of 3' in width, 3' in height and 9" in depth. It is to be appreciated that the depth of panel section 12 may range from 0.1875" to 0.19" in depth. It is to be understood, of course, that the female (groove) connections 14 are to be found at all four edges of section 12, and that they correspondingly connect to pieces with male (tongue) connectors of other pieces in the system.

The applications of panel section 12 is as a solid rectangular low-wall sections where a full wall is not needed or required. For example, referring now to FIGS. 8(a) and 8(b), an exterior elevation view and a plan view, respectively, of example applications of panel section 12 are shown. In FIG. 8(a), a scale model 80 has one panel section 12 being utilized in its construction. In FIG. 8(b), two panel sections 12 are shown interconnected with other system pieces.

Referring back specifically to FIG. 1(d), a solid triangular Gable panel section 13 for a 4-pitch roof having two female connectors 14 and one male connector 15 is shown. Solid triangular piece with a male (tongue) connector on bottom applied as a Gable Wall section standing upright in horizontal orientation above rectangular wall sections and below roof sections at 4-pitch angle. Male (tongue) connector along bottom edge, Female (groove) connections on two other edges (top and side).

Referring now to FIGS. 9(a), 9(b) and 9(c), an isometric view, an exterior elevation view and a plan view, respectively, of example applications of panel section 13 are shown. In FIG. 9(a), an example of how panel section 13 is fitted onto panel section 10 is shown. In FIG. 9(b), a scale model 90 has six panel sections 13 being utilized in its construction. In FIG. 9(c), two panel sections 13 are shown interconnected with other system pieces.

Figure 2:
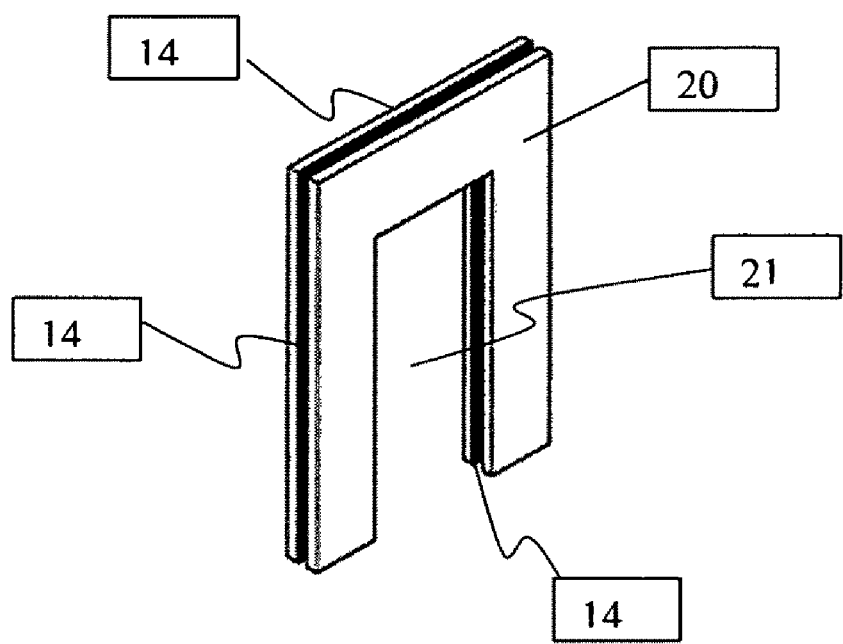
FIG. 2 is an illustration of an isometric perspective view of an architectural building component piece as grouped in a second class referred to as "openings", according to an embodiment of the present invention.

Referring now to FIG. 2, the second class of pieces in the architectural design aid classification system, that is, the "openings", are shown. The "openings" consist of rectangular panels with openings, and are applied as wall sections with door openings or window cutouts, or roof sections with skylight cutouts.

Preferably, the "openings" pieces consist of the following:

| PIECE DESCRIPTION | ACTUAL DIMENSION | SCALE DIMENSION | CONNECTIONS |
|---|---|---|---|
| rectangular section with 3' × 7' Door cutout | 1.5" (w) × 2.25" (h) × .19" (d) | 6' (w) × 9' (h) × 9" (d) | Female only |
| rectangular section with Window cutout (with addition of "insert" piece)* | 1.5" (w) × 2.25" (h) × .19" (d) | 6' (w) × 9' (h) × 9" (d) | Female only |

*It should be noted that knee-wall sections have to be inserted into the part piece to transform it from a door opening to a window or skylight cutout.

As can be seen from the above chart, each of the shapes and sizes within the "openings" class are provided in one connection format: female-only connectors (i.e., grooves on all connectable sides). It should be noted that all of the shapes and sizes within the "openings" class also provide female connectors on all sides of the opening or cutout itself. Thus, the female (groove) connectors at the four outer edges are available to connect to pieces with male (tongue) connectors, while the female connectors on the inside edges around the cutout opening are available to connect with male connectors on "insert" class pieces.

As can be seen in FIG. 2, a rectangular Wall/Roof panel section 20 with Door/Window/Skylight cutout opening 21 is shown. In a preferred embodiment as shown, the panel section 20 is provided with the cutout opening 21 applied in an upright vertical orientation from the bottom and in a rectangular shape to thereby act as a doorway. It is to be understood, of course, that the doorway can be converted into a window or roof skylight opening when combined with an appropriate "insert" piece (not shown). Further, the cutout opening 21, with its female connecters 14, allow for a 1/16" thick transparent plastic solid rectangular piece to be inserted into the cutout opening to mimic a window pane of glass (when used with an "insert" piece, or provide the potential ability for a modular door or window scale model piece to be inserted into the door or window opening respectively.

Referring now to FIGS. 10(a) and 10(b), an exterior elevation view and a plan view, respectively, of example applications of panel section 20 are shown. In FIG. 10(a), a scale model 100 has two panel sections 20 being utilized in its construction. One embodiment of panel section 20 is shown acting as a doorway, while the other embodiment of panel section 20 is shown acting as a window (with appropriate "insert" piece). In FIG. 10(b), one panel sections 20 is shown interconnected with other system pieces.

Figure 3:
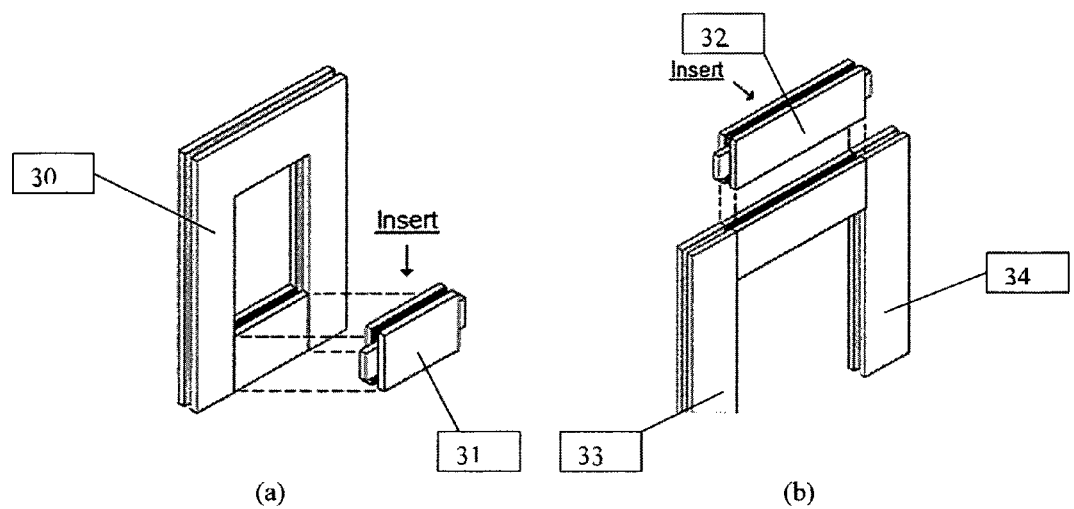
FIG. 3 is an illustration of an isometric perspective view of various architectural building component pieces (a-b) as grouped in a third class referred to as "inserts", according to an embodiment of the present invention.

Referring now to FIG. 3, the third class of pieces in the architectural design aid classification system, that is, the "inserts", are shown. The "inserts" consist of solid rectangular panels inserted into "openings" pieces as knee-walls to transform fixed doorway cutouts into windows or skylights, or connected adjacent to solid wall sections as headers and/or knee-walls to create custom door and window openings.

Preferably, the "inserts" pieces consist of the following:

| PIECE DESCRIPTION | ACTUAL DIMENSION | SCALE DIMENSION | CONNECTIONS |
|---|---|---|---|
| 3' solid rectangular Knee-wall/Header section | .75" (w) × .5" (h) × .19" (d) | 3' (w) × 2' (h) × 9" (d) | Male & Female |
| 3' solid rectangular Knee-wall/Header section | .75" (w) × .75" (h) × .19" (d) | 3' (w) × 3' (h) × 9" (d) | Male & Female |
| 6' solid rectangular Knee-wall/Header section | 1.5" (w) × .5" (h) × .19" (d) | 6' (w) × 2' (h) × 9" (d) | Male & Female |
| 8' solid rectangular Knee-wall/Header section | 2" (w) × .5" (h) × .19" (d) | 8' (w) × 2' (h) × 9" (d) | Male & Female |

As can be seen from the above chart, each of the shapes and sizes within the "inserts" class are provided in one connection format: male-and-female connectors (i.e., tongue on two sides, groove on two sides). The male connectors are located on each ends of the "inserts" pieces, while the female connectors are located on the sides (top and bottom) of the "inserts" pieces. It is to be understood, of course, that such positioning of the connectors, either individually or as a pair, may be switched between such sides and ends.

Referring specifically to FIG. 3(a), a ¾" wide solid rectangular knee-wall/header insert section 31 with two male and two female connectors (not labeled) is shown. As can be seen, insert section 31 can be inserted into a doorway opening 30 as a knee-wall to convert the doorway into a window opening. It is to be understood, of course, that such insert section can also be connected as knee-wall or header with other solid wall sections to form custom window and doorway openings as desired.

Referring now to FIGS. 11(a) and 11(b), an exterior elevation view and a plan view, respectively, of example applications of insert section 31 are shown. In FIG. 11(a), a scale model 110 has three insert sections 31 being utilized in its construction. The middle of the three insert sections has been inserted as a knee-wall in doorway opening 30, while the outer two of the three insert sections have been placed as knee-walls on either side of the doorway opening. In FIG. 11(b), the three insert sections are shown interconnected with the other system pieces.

Referring back specifically to FIG. 3(b), a ½" high solid rectangular knee-wall/header insert section 32 with two male and two female connectors (not labeled) is shown. As can be seen, insert section 32 can be connected as a header between two solid wall sections 33 and 34 with female connectors to form a custom window and/or door opening. Such versatility allows for creating custom wall openings as desired.

Referring now to FIGS. 12(a) and 12(b), an exterior elevation view and a plan view, respectively, of example applications of insert section 32 are shown. In FIG. 12(a), a scale model 120 has three insert sections 32 being utilized in its construction. In FIG. 12(b), the one of the three insert sections is shown interconnected with the other system pieces.

Figure 4:
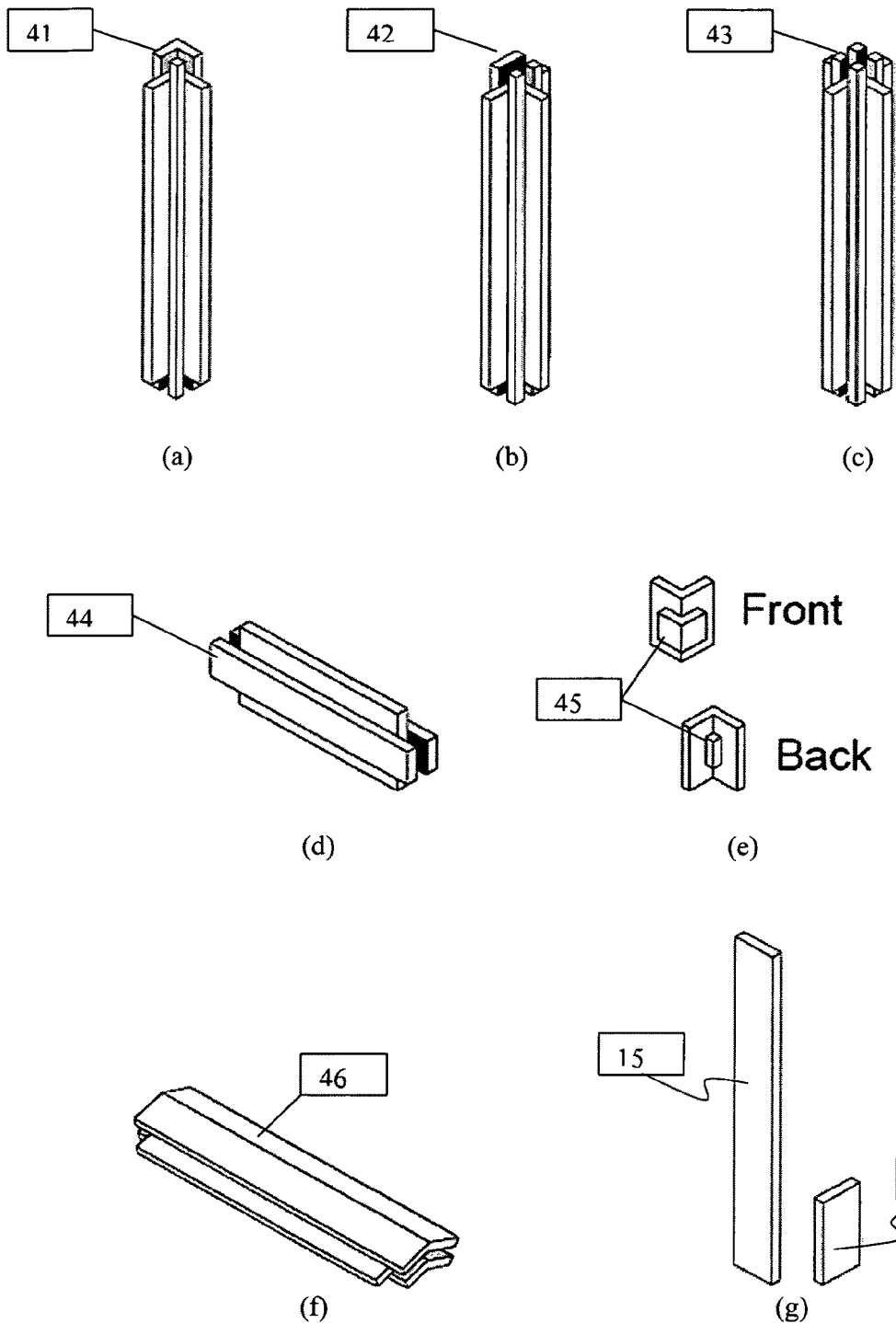
FIG. 4 is an illustration of an isometric perspective view of various architectural building component pieces (a-g) as grouped in a fourth class referred to as "connectors", according to an embodiment of the present invention.

Referring now to FIG. 4, the fourth class of pieces in the architectural design aid classification system, that is, the "connectors", are shown. The "connectors" consist of connection pieces applied as intersections either horizontally or vertically where two or more walls, floors or roofs intersect at different or same angles (e.g., such as two upright walls joining at a 90-degree corner).

Preferably, the "connectors" pieces consist of the following:

lines of site when the part is connected in place in its intended location, with all adjacent parts in place as well. This means that the face area dimensions do not include the male (tongue) connector that is not visible when inserted into the adjacent female (groove) connector.

Referring specifically to FIG. 4(a), a corner intersection 41, with two male connectors, for connecting two Walls/Floor/Roof panel sections (not shown) at a 90 degree angle is shown. Accordingly, in an upright vertical orientation the corner intersection 41 can be utilized to connect two Wall sections. Also accordingly, in a horizontal orientation the corner intersection 41 can be utilized to connect one Wall section and one Roof section, or alternatively also in horizontal orientation the corner intersection 41 can be utilized to connect one Wall section and one Floor section. While corner intersection 41 is shown with a male (tongue) connector along both sides and a small female (groove) connections at top and bottom, it is to be understood that such connectors may be alternated.

Referring now to FIGS. 13(a), 13(b) and 13(c), an example application, an exterior elevation view and a plan view, respectively, of example applications of corner intersection

| PIECE DESCRIPTION | ACTUAL DIMENSION | SCALE DIMENSION | CONNECTIONS |
|---|---|---|---|
| 9' Corner intersection for 2 Walls/Floor at 90° angle | .19" (w) × 2.25" (h) × .19" (d) | 9" (w) × 9' (h) × 9" (d) | Male & Female |
| 3' Corner intersection for 2 Walls/Floor at 90° angle | .19" (w) × .75" (h) × .19" (d) | 9" (w) × 3' (h) × 9" (d) | Male & Female |
| 9' T-Intersection for 3 Walls/Floor at 90° angles | .19" (w) × 2.25" (h) × .19" (d) | 9" (w) × 9' (h) × 9" (d) | Male & Female |
| 3' T-Intersection for 3 Walls/Floor at 90° angles | .19" (w) × .75" (h) × .19" (d) | 9" (w) × 3' (h) × 9" (d) | Male & Female |
| 9' Cross-Intersection for 4 Walls/Floors at 90° angles | .19" (w) × 2.25" (h) × .19" (d) | 9" (w) × 9' (h) × 9" (d) | Male & Female |
| 3' Cross-Intersection for 4 Walls/Floors at 90° angles | .19" (w) × .75" (h) × .19" (d) | 9" (w) × 3' (h) × 9" (d) | Male & Female |
| 9' Straight-intersection at 180° for 2 Walls/Floor/Roof | .19" (w) × 2.25" (h) × .19" (d) | 9" (w) × 9' (h) × 9" (d) | Male & Female |
| 5' Straight-intersection at 180° for 2 Walls/Floor/Roof | .19" (w) × 1.25" (h) × .19" (d) | 9" (w) × 5' (h) × 9" (d) | Male & Female |
| 3' Straight-intersection at 180° for 2 Walls/Floor/Roof | .19" (w) × .75" (h) × .19" (d) | 9" (w) × 3' (h) × 9" (d) | Male & Female |
| 9" Corner intersection for 2 floor joists at 90° angle | .19" (w) × .19" (h) × .19" (d) | 9" (w) × 9" (h) × 9" (d) | Male only |
| 9' Roof Ridge section for 4-pitch roof | .19" (w) × 2.25" (h) × .19" (d) | 9" (w) × 9' (h) × 9" (d) | Male & Female |
| 5' Roof Ridge section for 4-pitch roof | .19" (w) × 1.25" (h) × .19" (d) | 9" (w) × 5' (h) × 9" (d) | Male & Female |
| 3' Roof Ridge section for 4-pitch roof | .19" (w) × .75" (h) × .19" (d) | 9" (w) × 3' (h) × 9" (d) | Male & Female |
| 8' Tongue insert (for joining two adjacent Female connectors) | .25" (w) × 2" (h) × .063" (d) | 1' (w) × 8' (h) × 3" (d) | Male only |
| 2' Tongue insert (for joining two adjacent Female connectors) | .25" (w) × .5" (h) × .063" (d) | 1' (w) × 2' (h) × 3" (d) | Male only |

With regard to actual physical construction, all parts in the building block system connect together with a male (tongue) and female (groove) connection between any two adjacent parts. The male connector on one part interlocks with the female connector on the adjacent part. The male connector is preferably ⅛" wide, 1/16" thick, and runs the length of the side of the part it is molded on, stopping ⅛" from both ends. The female connector is preferably ⅛" deep, 1/16" wide, and runs the length of each connectable side of the part where there is no male connector. The "face area" dimensions of the parts refer to the flat surface area that is visible from the viewer's 41 are shown. In FIG. 13(a), corner intersection 41 has been inserted as a corner connector piece between two panel sections 10 by insertion of the male connectors into the female connectors. In FIG. 13(b), a scale model 130 has five corner intersections 41 being utilized in its construction. In FIG. 13(c), the four corner intersections are shown interconnected with the other system pieces.

Referring back specifically to FIG. 4(b), a 3-prong ("T") intersection 42, with three male connectors, for connecting three Walls/Floors/Roof panel sections (not shown) at 90 degree angles is shown. Accordingly, in an upright vertical orientation the 3-prong intersection 42 can connect three Wall sections, or in a horizontal orientation the 3-prong intersection 42 can connect a combination of Wall, Roof and Floor sections. While 3-prong intersection 42 is shown with a male (tongue) connector along all three sides and small female (groove) connections at top and bottom, it is to be understood that such connectors may be alternated.

Referring now to FIGS. 14(a), 14(b) and 14(c), an example application, an exterior elevation view and a plan view, respectively, of example applications of 3-prong intersection 42 are shown. In FIG. 14(a), 3-prong intersection 42 has been inserted as a corner connector piece between three panel sections 10 by insertion of the male connectors into the female connectors. In FIG. 14(b), a scale model 140 has three 3-prong intersections 42 being utilized in its construction. In FIG. 14(c), the 3-prong intersection is shown interconnected with the other system pieces.

Referring back specifically to FIG. 4(c), a 4-Prong ("cross") intersection 43, with four male connectors, for connecting four Walls/Floors/Roof panel sections (not shown) at 90 degree angles is shown. Accordingly, in an upright vertical orientation the 4-prong intersection 43 can connect four Wall sections, or in a horizontal orientation the 4-prong intersection 43 can connect a combination of Wall, Roof and Floor sections. While 4-prong intersection 43 is shown with a male (tongue) connector along all four sides and small female (groove) connections at top and bottom, it is to be understood that such connectors may be alternated.

Referring now to FIGS. 15(a), 15(b) and 15(c), an example application, an exterior elevation view and a plan view, respectively, of example applications of 4-prong intersection 43 are shown. In FIG. 15(a), 4-prong intersection 43 has been inserted as an intersection connector piece between four panel sections 10 by insertion of the male connectors into the female connectors. In FIG. 15(b), a scale model 150 has a 4-prong intersection 43 being utilized in its construction. In FIG. 15(c), the 4-prong intersection is shown interconnected with the other system pieces.

Referring back specifically to FIG. 4(d), a 2-prong ("straight") intersection 44, with two male connectors, for connecting two Walls/Floors/Roof panel sections (not shown) at 180 degree angles is shown. Accordingly, the 2-prong intersection 44 can be utilized in a horizontal upright orientation to connect two Wall sections at 180 degree angle for 2-story high rooms, or in an upright vertical orientation two Wall sections requiring 0.1875" filler. Also accordingly, the 2-prong intersection 44 can be utilized in a horizontal flat orientation to connect two Roof or Floor sections. While 2-prong intersection 44 is shown with a male (tongue) connector along each of the two sides and a female (groove) connections at each end, it is to be understood that such connectors may be alternated.

Referring now to FIGS. 16(a), 16(b) and 16(c), an example application, an exterior elevation view and a plan view, respectively, of example applications of 2-prong intersection 44 are shown. In FIG. 16(a), 2-prong intersection 44 has been inserted as an intersection connector piece between two panel sections 10 by insertion of the male connectors into the female connectors. In FIG. 16(b), a scale model 160 has a 2-prong intersection 44 being utilized in its construction. In FIG. 16(c), the 2-prong intersection is shown interconnected with the other system pieces.

Referring back specifically to FIG. 4(e), a front and back perspective of corner intersection 45, with two male connectors, for connecting two floor joists at a 90 degree angle is shown. Accordingly, a corner intersection 45 can be utilized for filling an exterior wall void at corners where two wall panel sections (not shown) meet in a 2-story and/or higher houses. The corner intersection, by construction, has a male (tongue) connector at each side at a 90 degree angle.

Referring now to FIGS. 17(a), 17(b) and 17(c), an example application, an exterior elevation view and a plan view, respectively, of example applications of corner intersection 45 are shown. In FIG. 17(a), corner intersection 45 has been inserted as an intersection connector piece between a number of panel sections 10, a corner intersection 41 and a 2-prong intersection 44 by insertion of the male connectors into the female connectors. In FIG. 17(b), a scale model 170 has four corner intersections 45 being utilized in its construction. In FIG. 17(c), the corner intersection is shown interconnected with the other system pieces.

Referring specifically to FIG. 4(f), a roof ridge section 46, having two male connectors, for a 4-pitch roof to join panel sections (not shown) on each side is shown. Accordingly, the roof ridge intersects at a ridge and allows for connecting of Roof sections. While roof ridge section 46 is shown with a male (tongue) connector along each of the two sides and a female (groove) connections at each end, it is to be understood that such connectors may be alternated.

Referring now to FIGS. 18(a), 18(b) and 18(c), an example application, an exterior elevation view and a plan view, respectively, of example applications of roof ridge section 46 are shown. In FIG. 18(a), roof ridge section 46 has been inserted as an ridge connector piece between a number of panel sections 10 by insertion of the male connectors into the female connectors. In FIG. 18(b), a scale model 180 has a roof ridge section 46 being utilized in its construction. In FIG. 18(c), the roof ridge section is shown interconnected with the other system pieces.

Referring specifically to FIG. 4(g), a large male ("tongue") connector 15 and a small male ("tongue") connector 16, either used to adjoin two adjacent female ("groove") connectors, are shown. As shown above, the male connectors are inserted into female connectors of two adjacent panel sections (not shown) to join the sections.

Referring now to FIGS. 19(a), 19(b) and 19(c), an example application, an exterior elevation view and a plan view, respectively, of example applications of male connectors 15 and 16 are shown. In FIG. 19(a), a male connector 15 is shown inserted into a female connector of panel section 10, and a male connector 16 is shown inserted into a female connector of panel section 12. In FIG. 19(b), a scale model 180 has a small male connector 16 being utilized in its construction to join two panel sections 10 and 12. In FIG. 19(c), the small connector is shown interconnected with the other system pieces.

Figure 5:
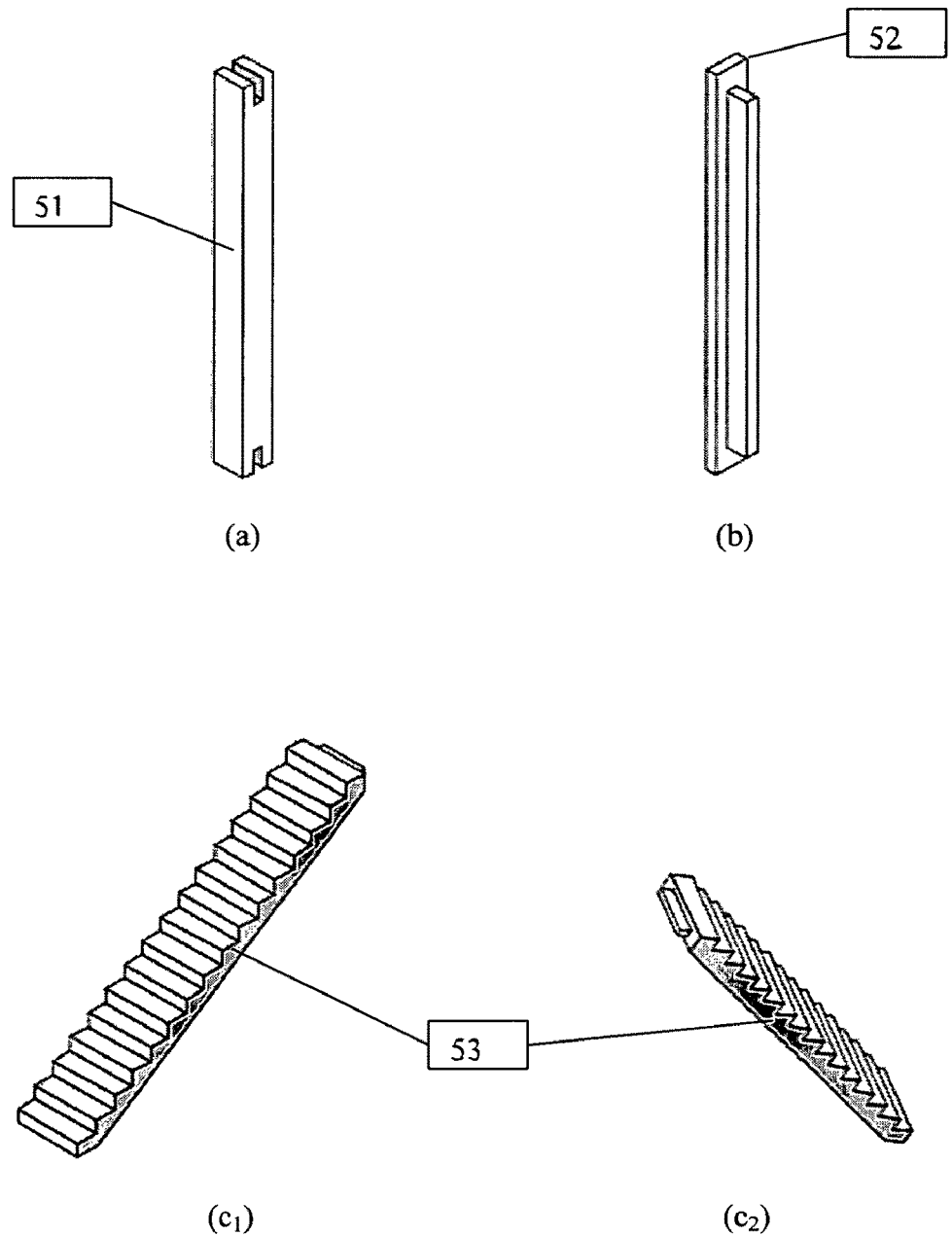
FIG. 5 is an illustration of an isometric perspective view of various architectural building component pieces (a-c$_2$) as grouped in a fifth class referred to as "details", according to an embodiment of the present invention.
Figure 6:
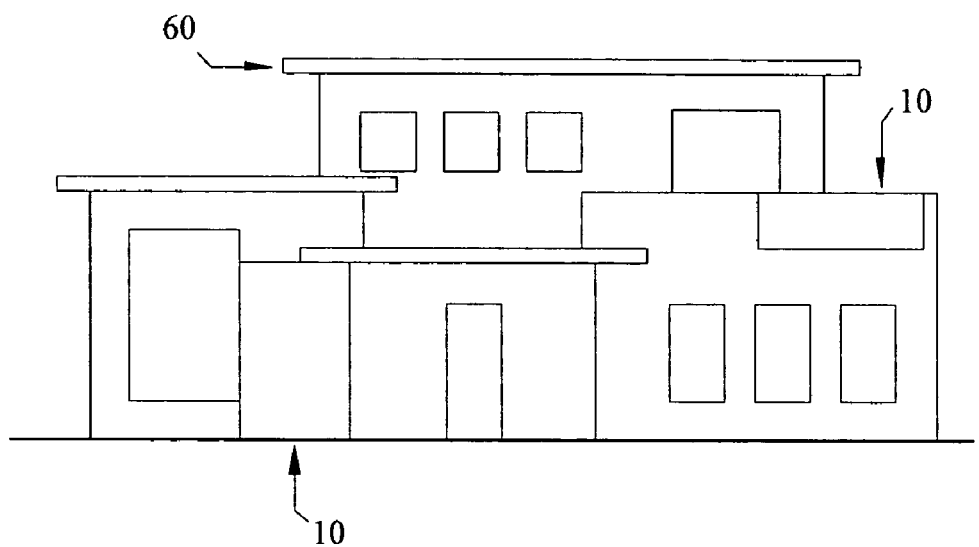
FIGS. 6-22 are illustrations of isometric perspective views showing various architectural building component pieces as they fit together and of elevation (either exterior or interior as the case may be) and plan views of sample applications utilizing the various architectural building component pieces from the five classifications in a scale model, according to an embodiment of the present invention.
Figure 6:
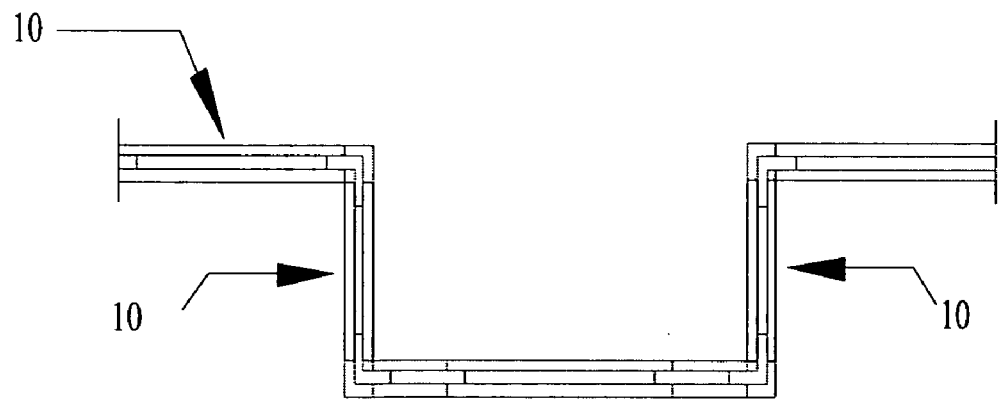
Figure 7:
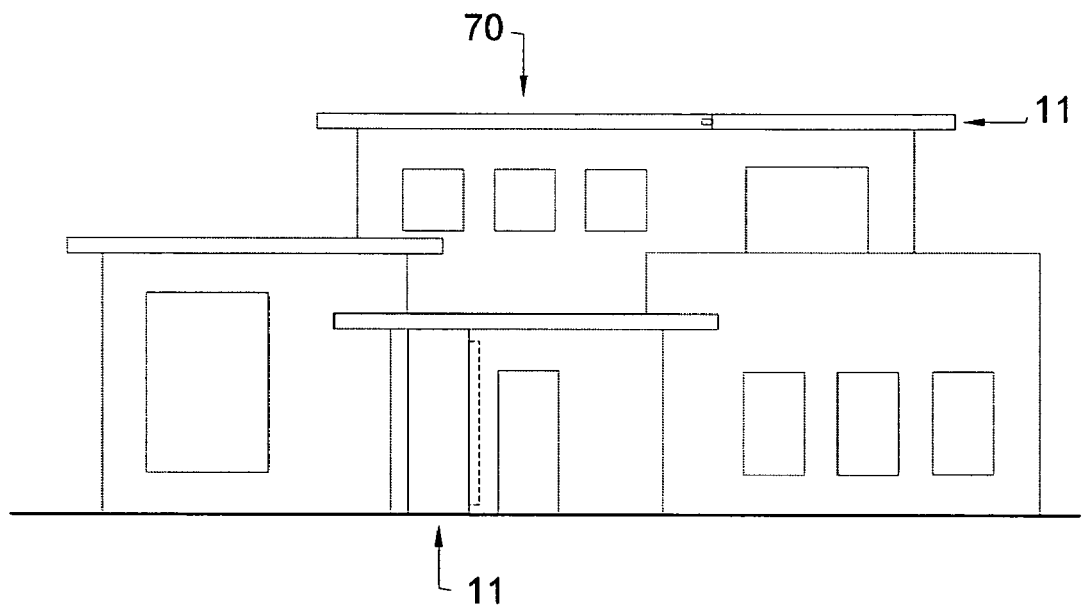
Figure 7:
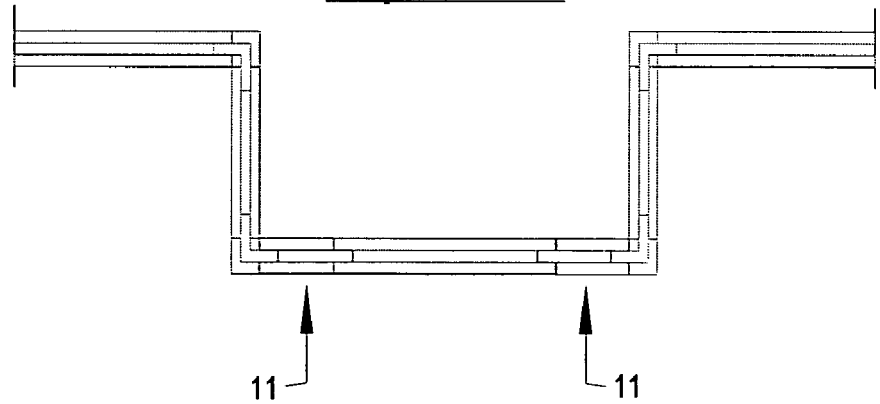
Figure 8:
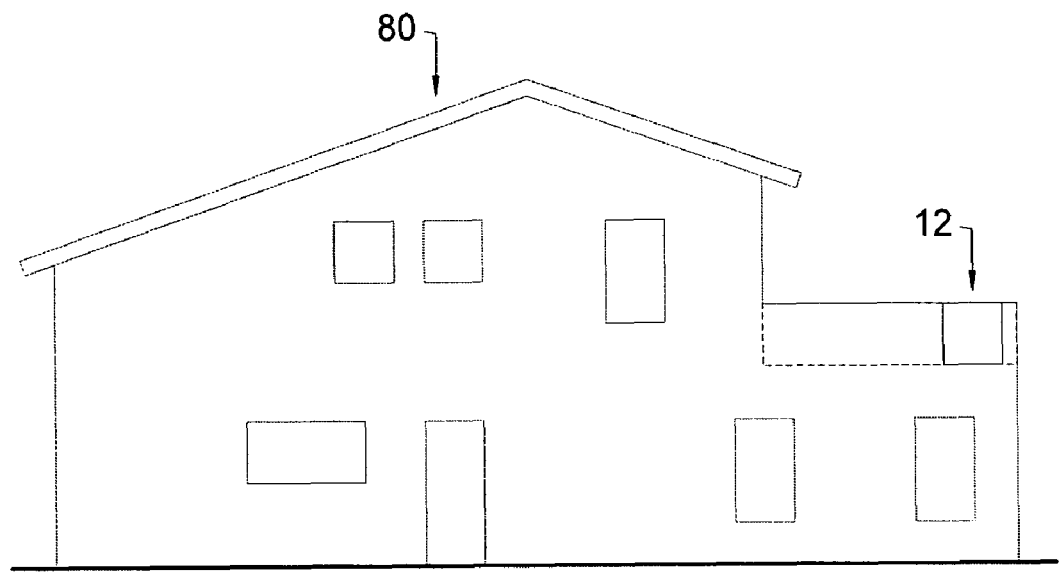
Figure 8:
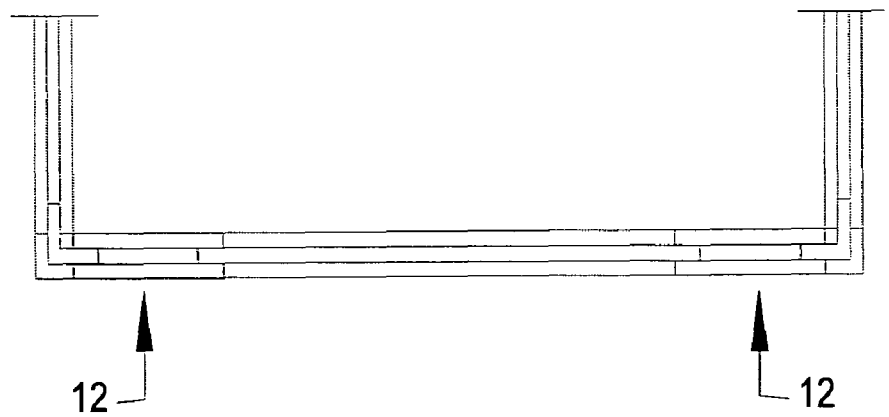
Figure 9:
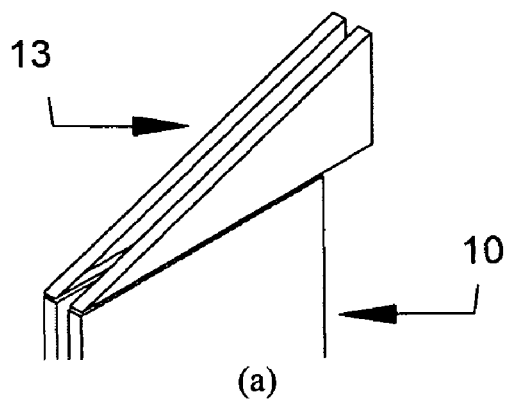
Figure 9:
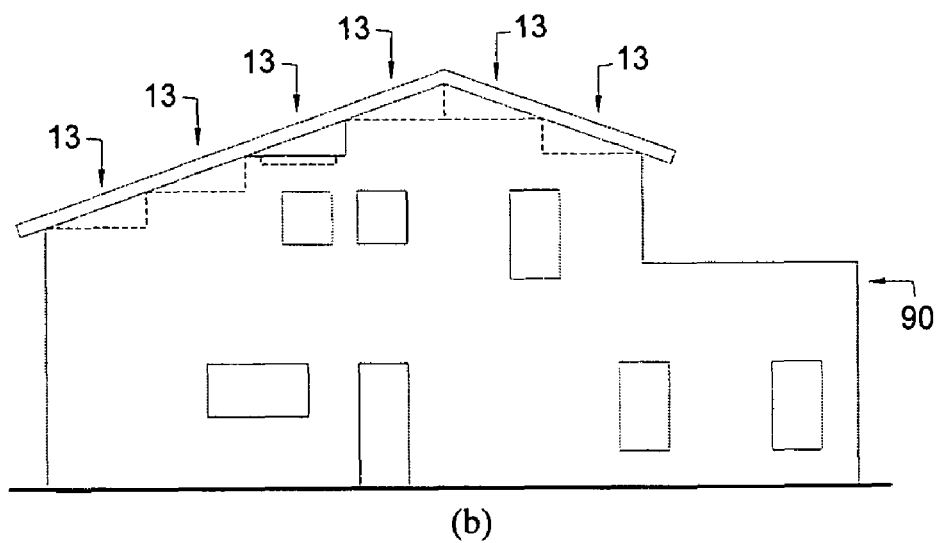
Figure 9:
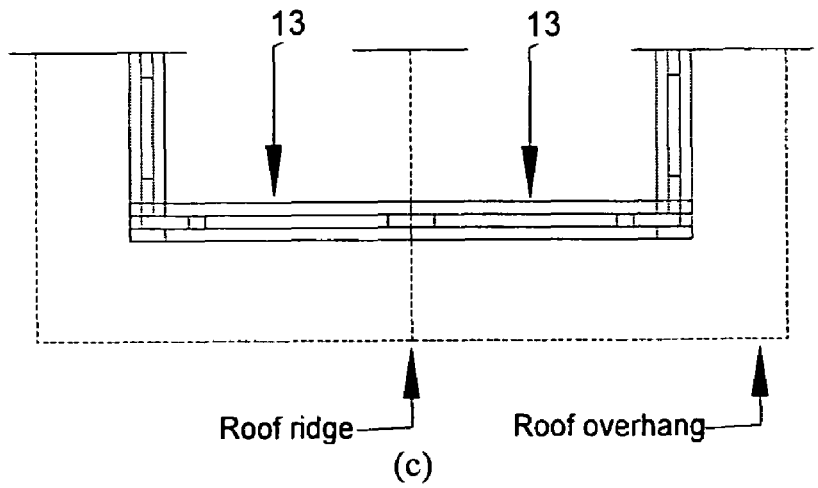
Figure 10:
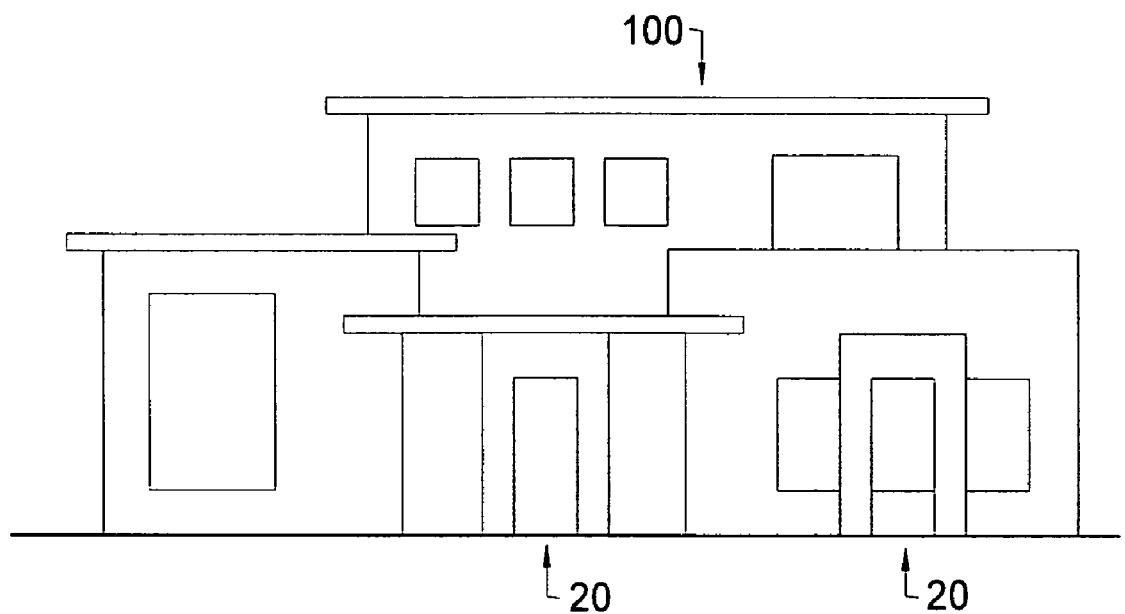
Figure 10:
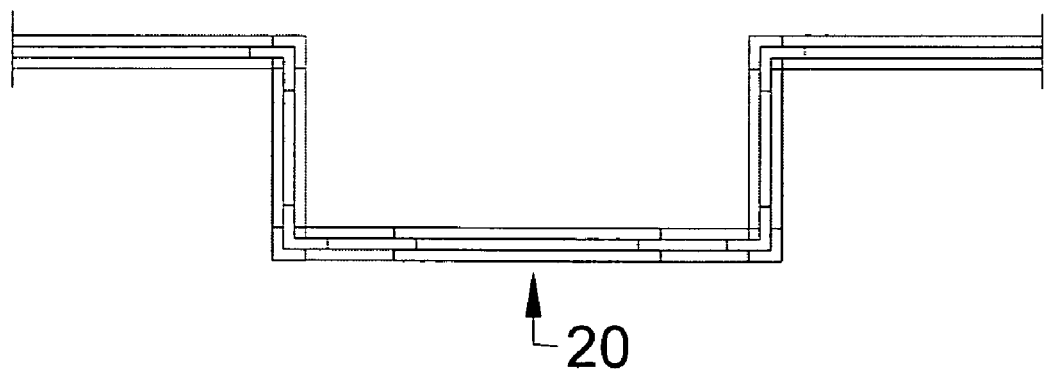
Figure 11:
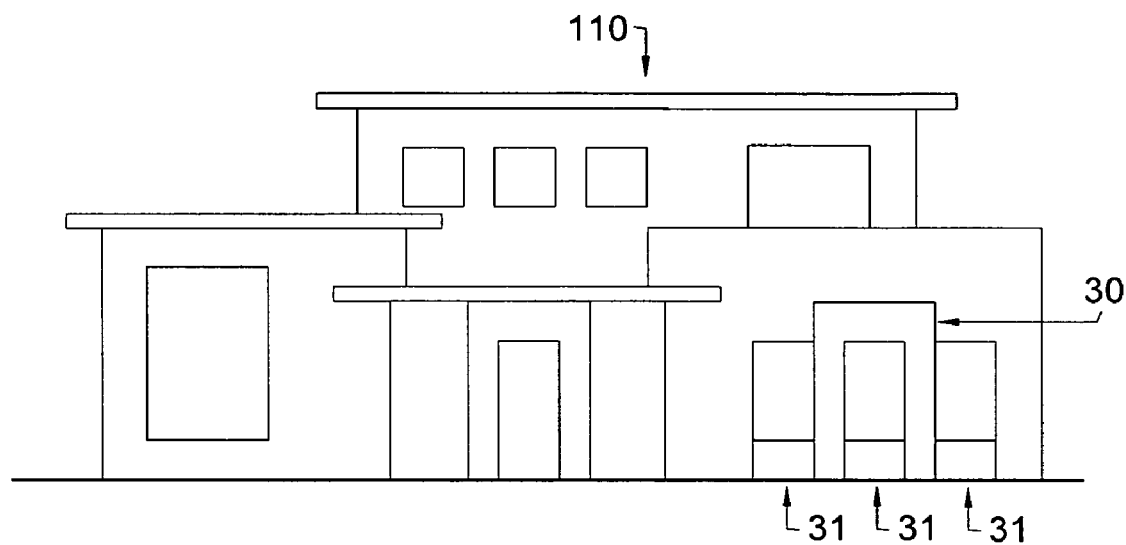
Figure 11:
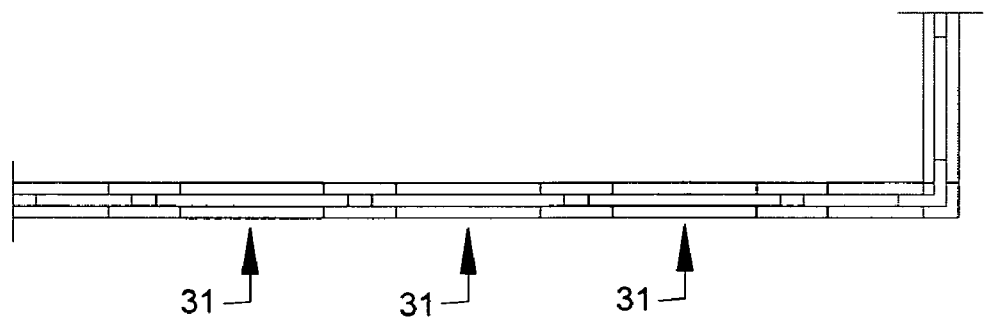
Figure 12:
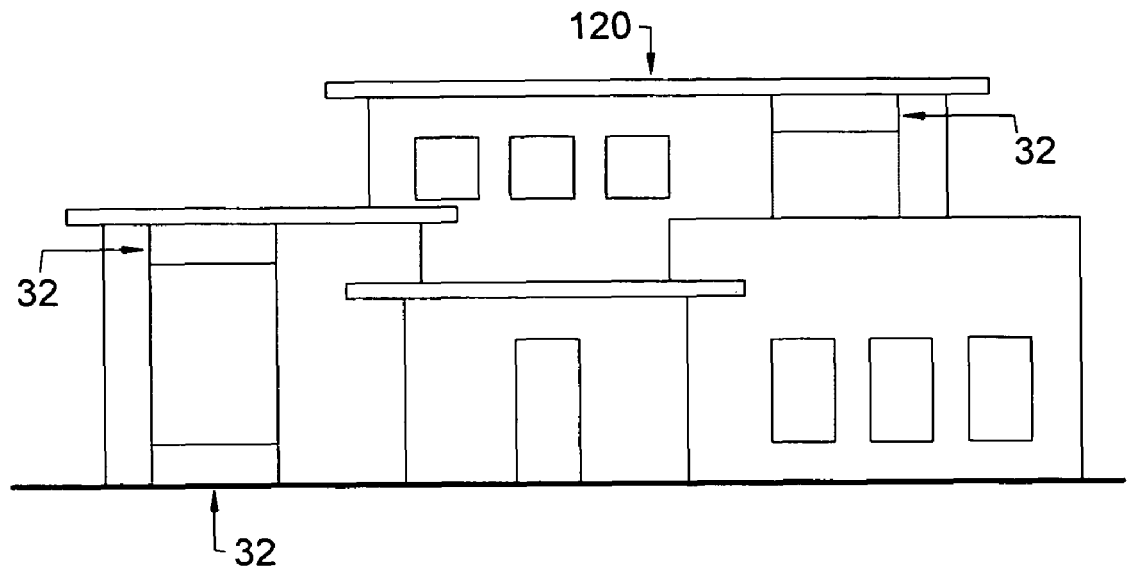
Figure 12:
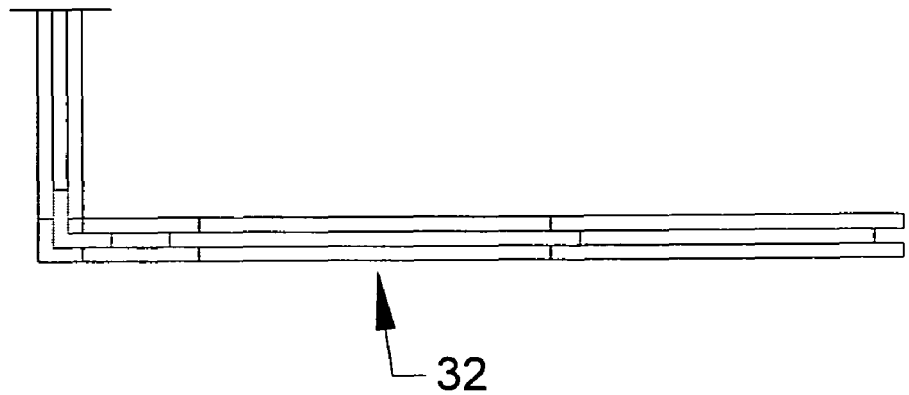
Figure 13:
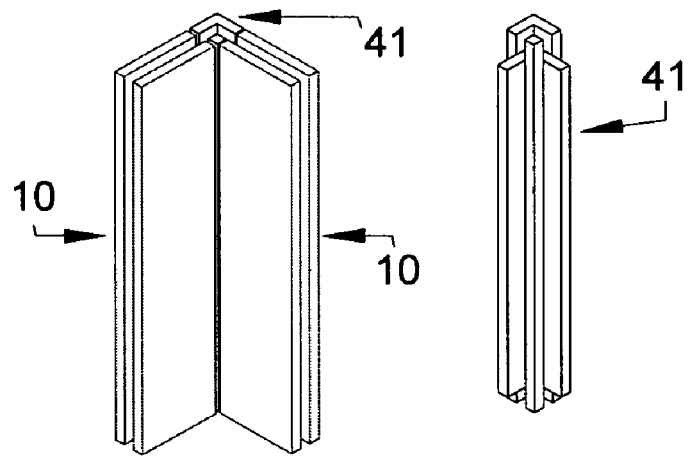
Figure 13:
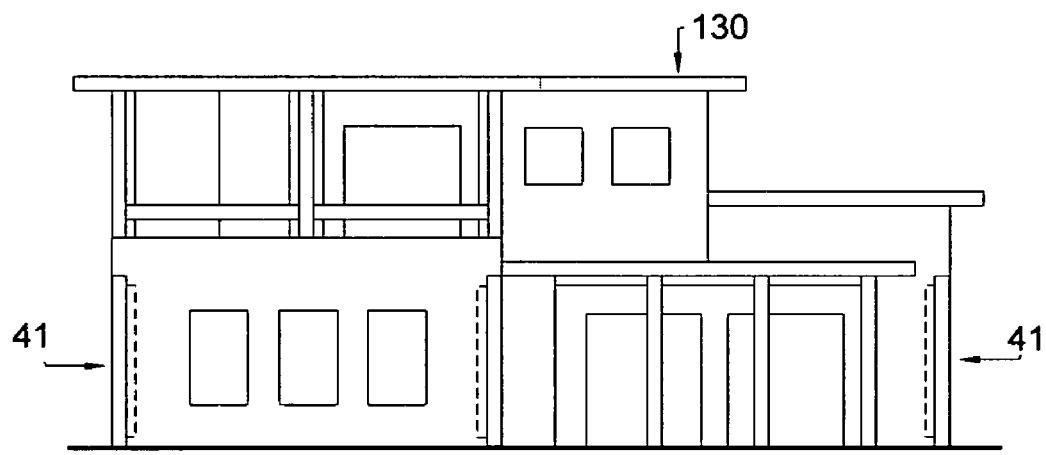
Figure 13:
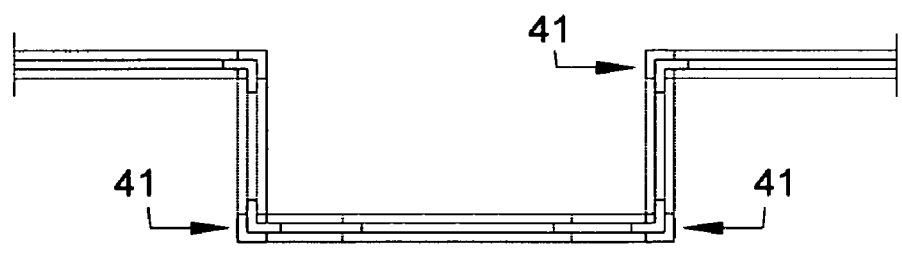
Figure 14:
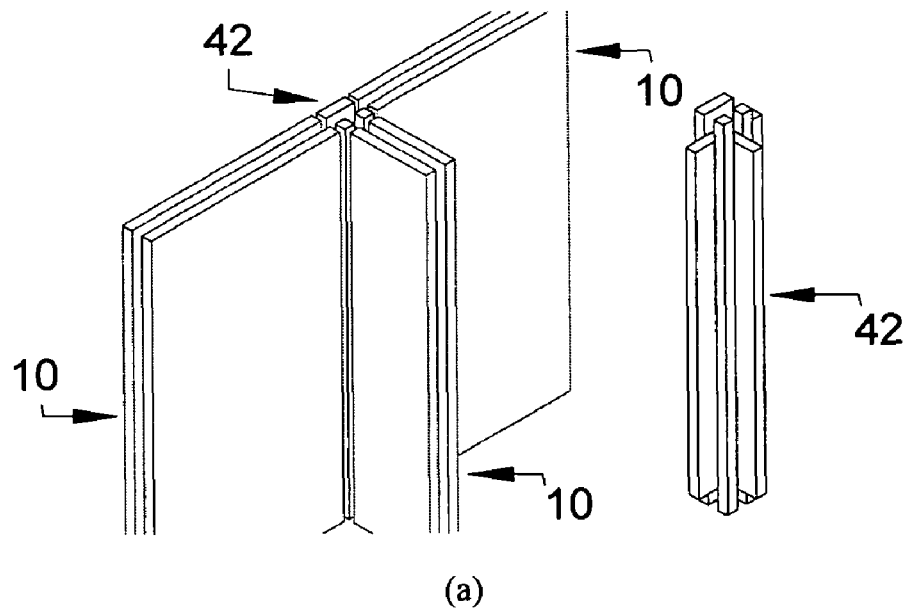
Figure 14:
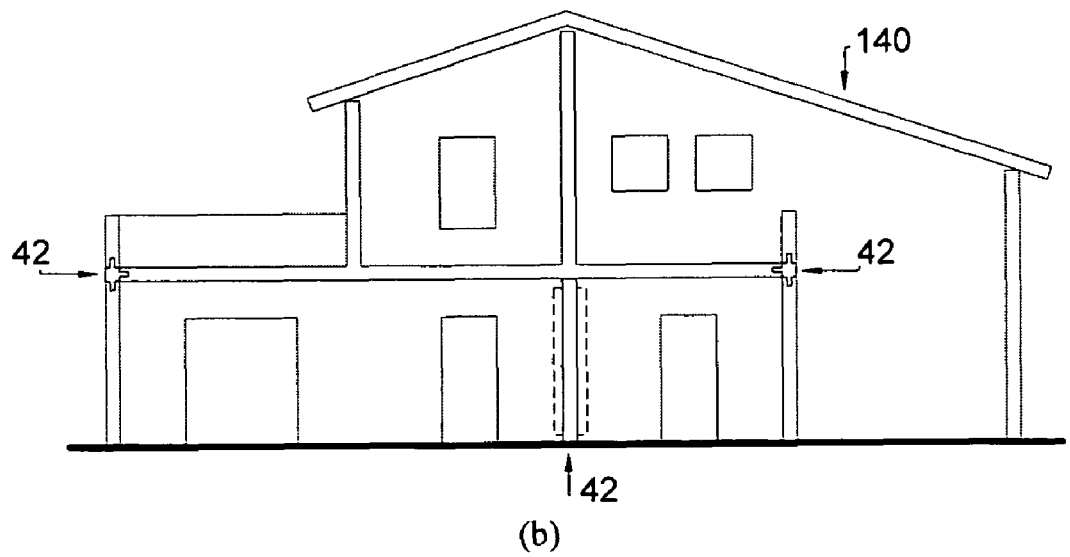
Figure 14:
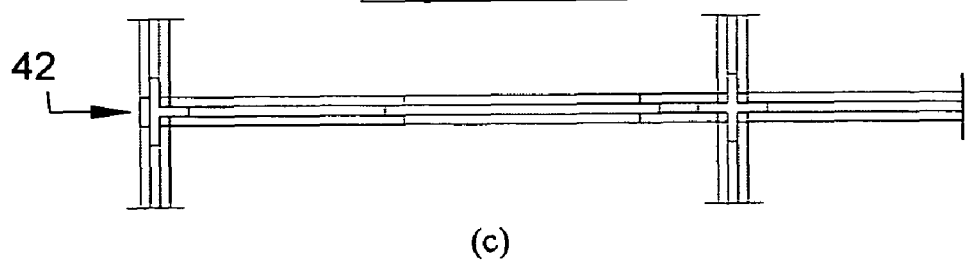
Figure 15:
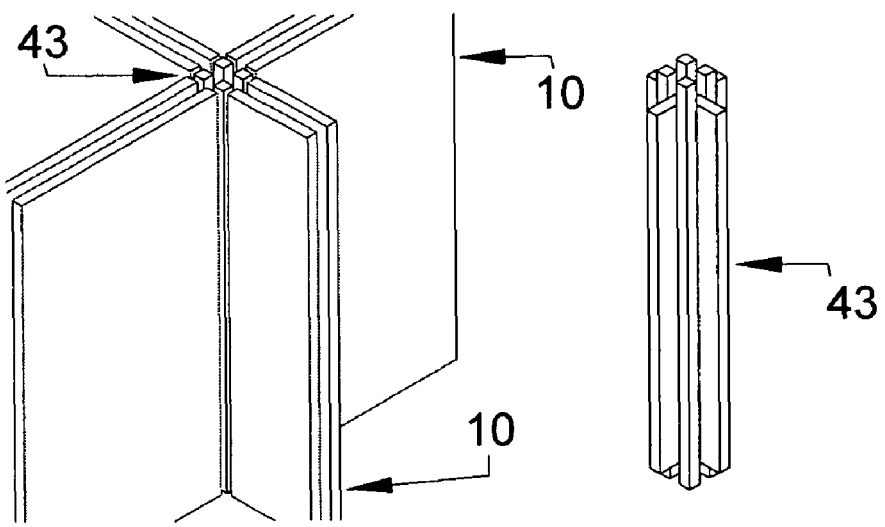
Figure 15:
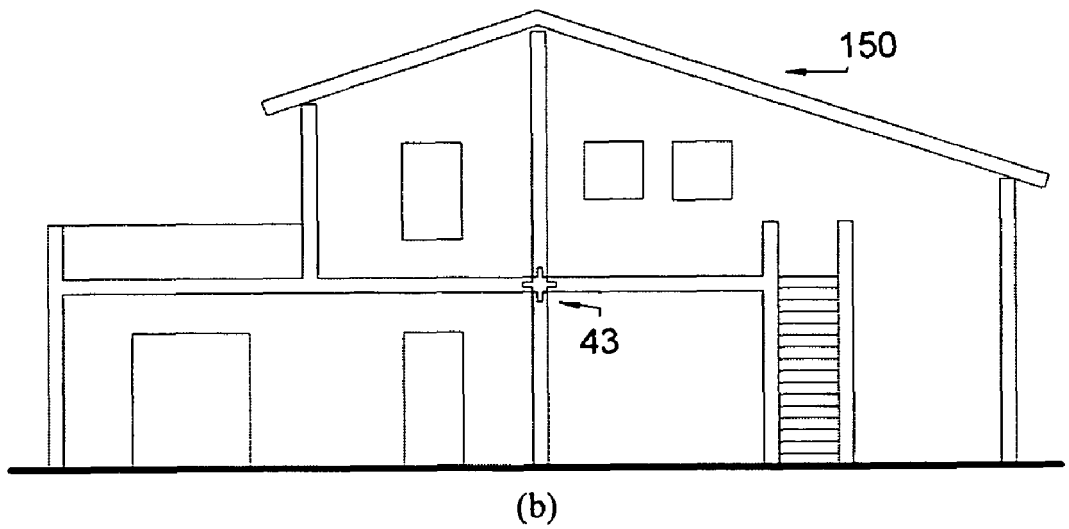
Figure 15:
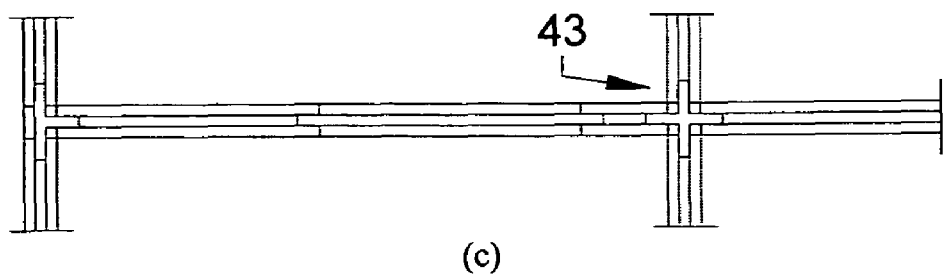
Figure 16:
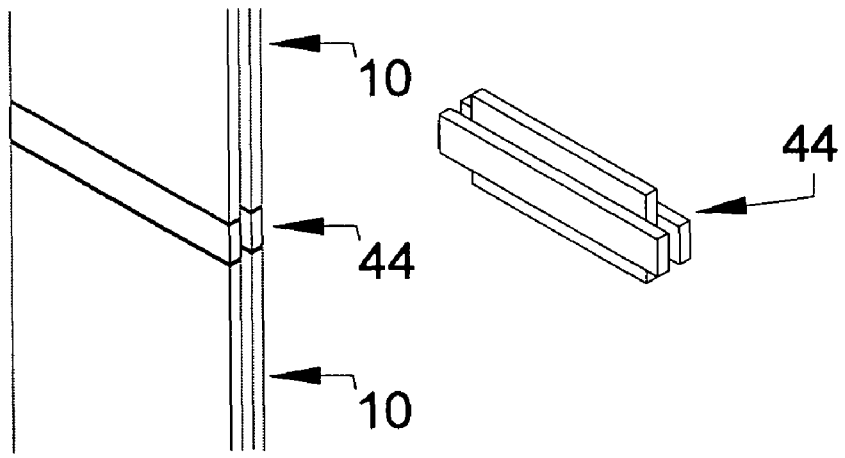
Figure 16:
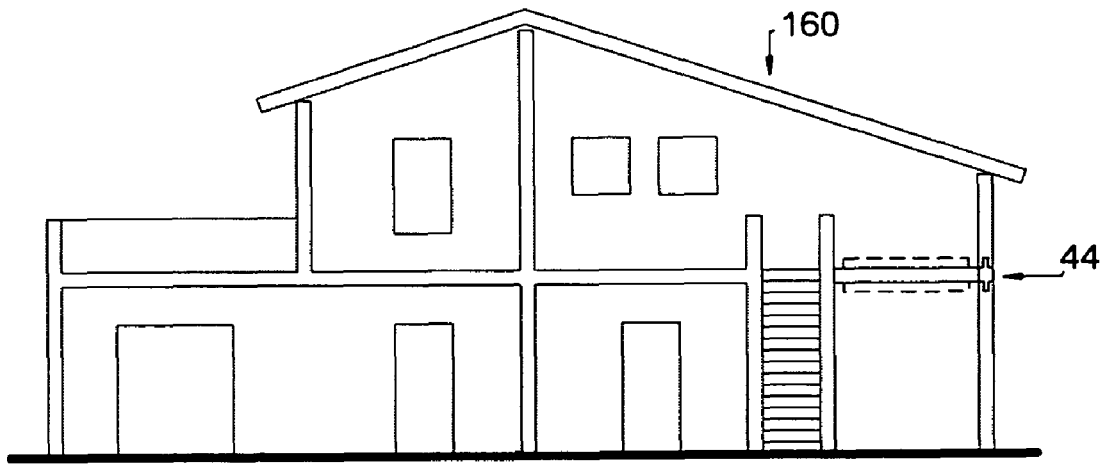
Figure 16:
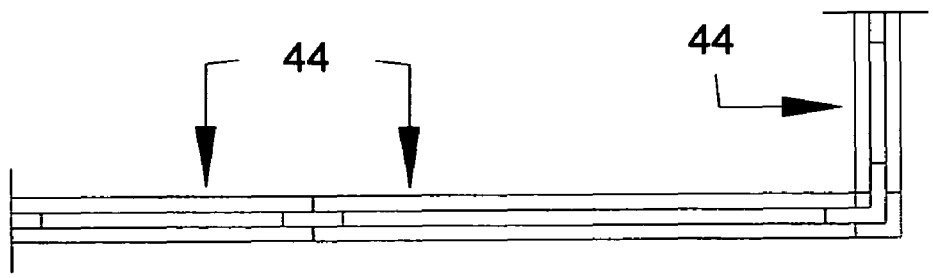
Figure 17:
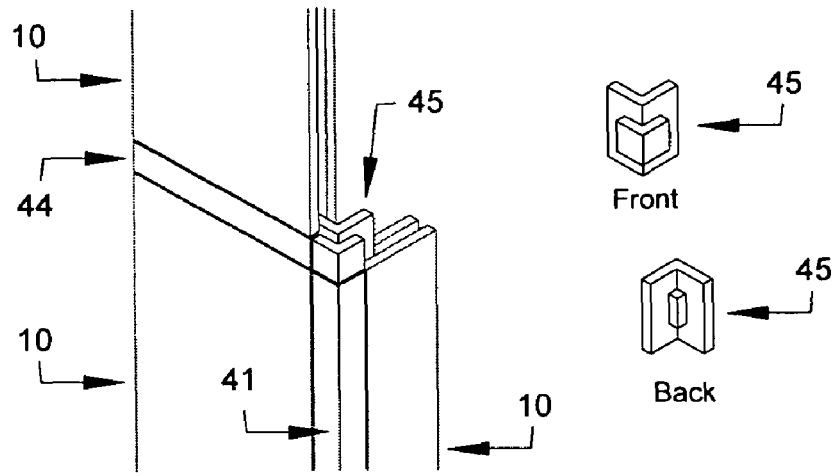
Figure 17:
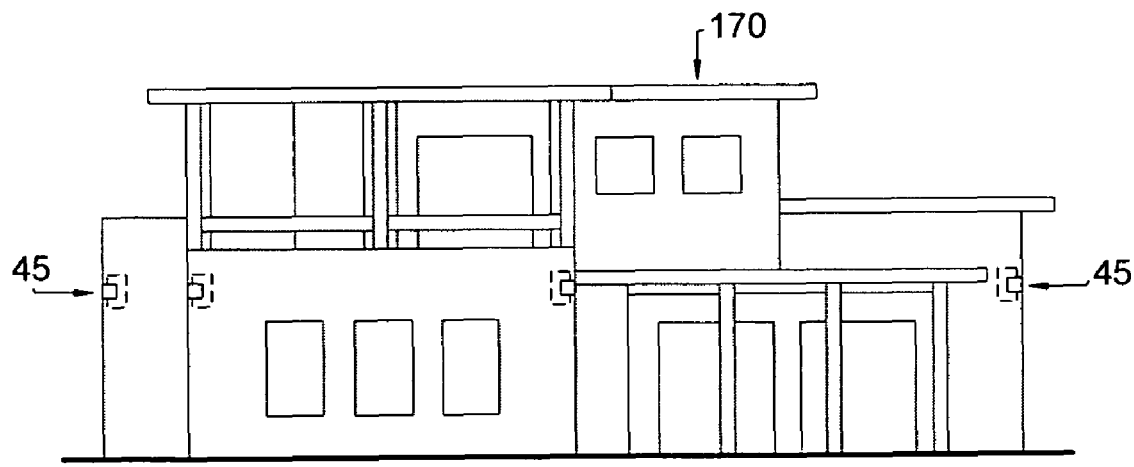
Figure 17:
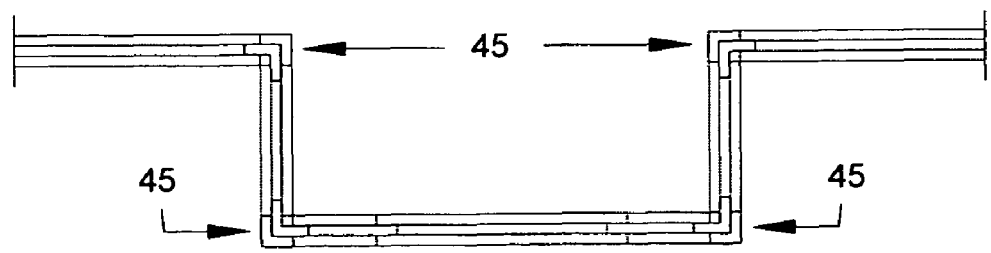
Figure 18:
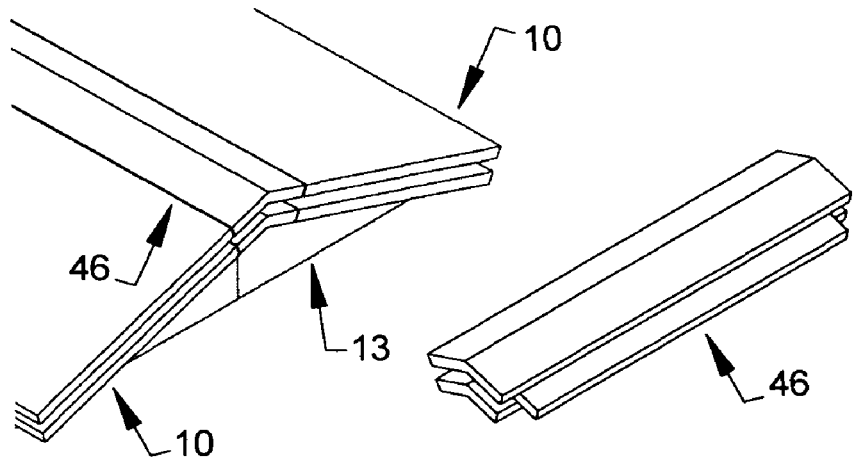
Figure 18:
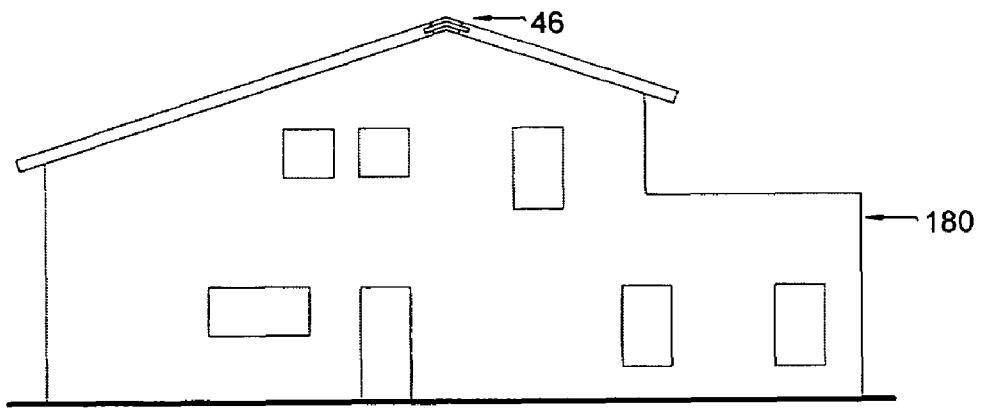
Figure 18:
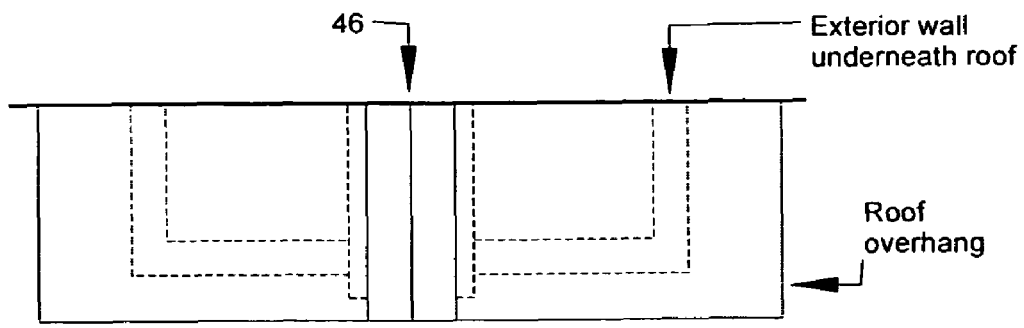
Figure 19:
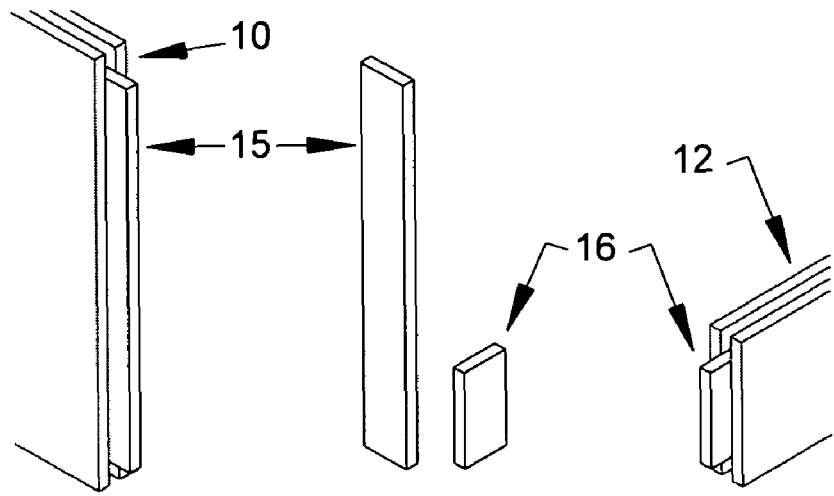
Figure 19:
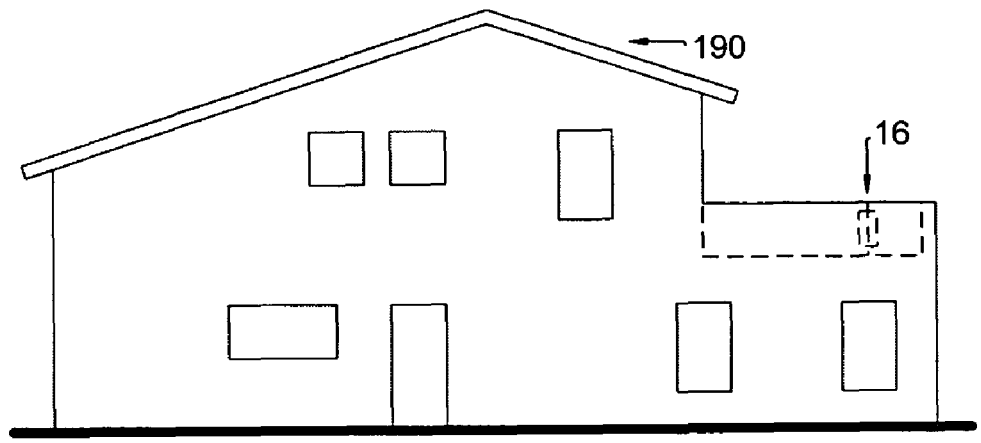
Figure 19:
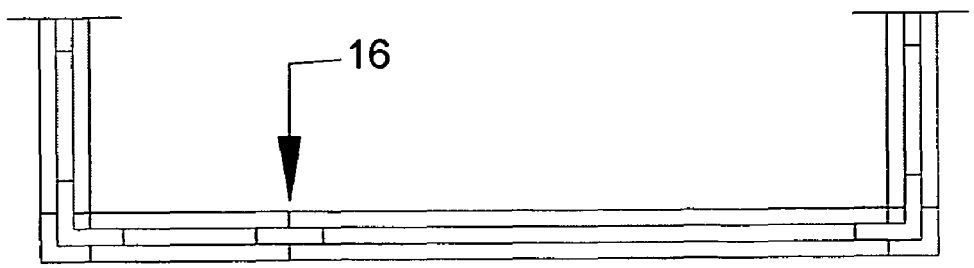
Figure 20:
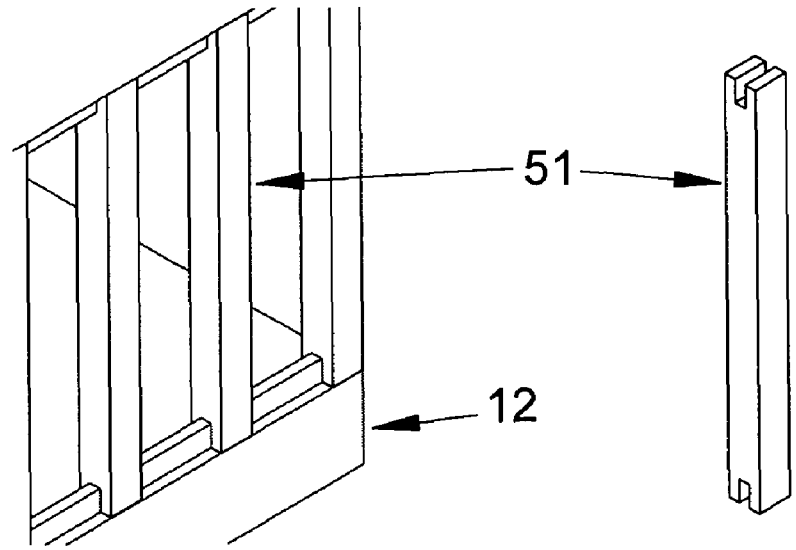
Figure 20:
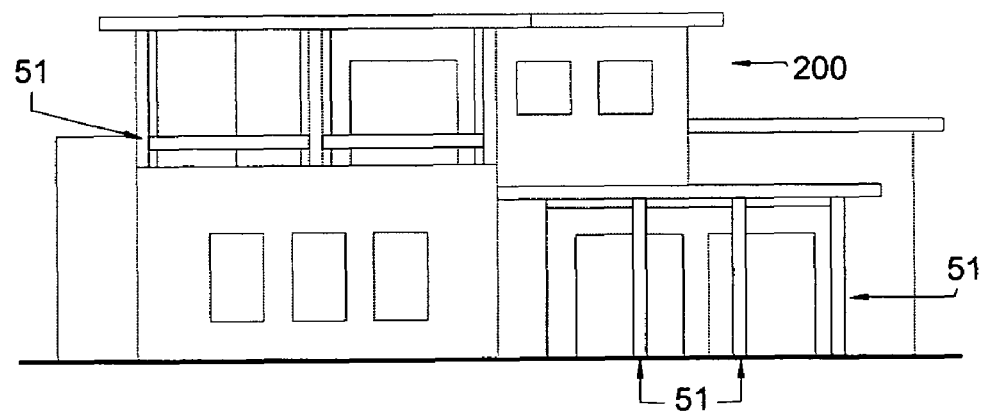
Figure 20:
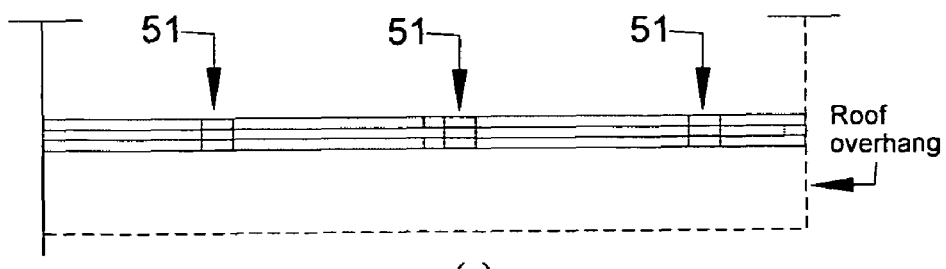

Referring now to FIG. 5, the fifth class of pieces in the architectural design aid classification system, that is, the "details", are shown. The "details" consist of additional pieces serving as special architectural details or fixtures, and can include staircases, columns, railings, and mullions for custom window openings.

Preferably, the "details" pieces consist of the following:

| PIECE DESCRIPTION | ACTUAL DIMENSION | SCALE DIMENSION | CONNECTIONS |
|---|---|---|---|
| Square Column/Mullion/Rail section | .19" (w) × 2.25" (h) × .19" (d) | 9" (w) × 9' (h) × 9" (d) | Female only (at ends) |
| 9' Groove-Cap section for concealing exposed grooves | .19" (w) × 2.25" (h) × .063" (d) | 9" (w) × 9' (h) × 3" (d) | Male only |
| 5' Groove-Cap section for concealing exposed grooves | .19" (w) × 1.25" (h) × .063" (d) | 9" (w) × 5' (h) × 3" (d) | Male only |
| 3' Groove-Cap section for concealing exposed grooves | .19" (w) × .75" (h) × .063" (d) | 9" (w) × 3' (h) × 3" (d) | Male only |
| 9'-9" rise Modular Staircase with 15 steps | .75" (w) × 2.44" (h) × 3.5" (d) | 3' (w) × 9.75' (h) × 14' (d) | Male only |

Referring specifically to FIG. 5(a), a detail piece 51, having female only connectors, that can be utilized as a square column, a custom window mullion, or a railing section is shown. The versatility of detail piece 51 can be seen when it is utilized in an upright vertical orientation as a column, in a horizontal or vertical orientation as a window mullion for creation of a custom window opening, or in a horizontal orientation as railing section. The detail piece 51, by construction, has a female (groove) connector at each end (i.e., top and bottom).

Referring now to FIGS. 20(a), 20(b) and 20(c), an example application, an exterior elevation view and a plan view, respectively, of example applications of detail piece 51 are shown. In FIG. 20(a), a number of detail pieces 51 are shown as window mullions inserted onto a male connector of each of two panel sections 12 to create a custom window. In FIG. 20(b), a scale model 200 has a number of detail pieces 51 being utilized in its construction as either railings or columns. In FIG. 20(c), the detail piece 51 is shown interconnected with the other system pieces.

Referring back specifically to FIG. 5(b), a groove-cap section 52, having a male (tongue) connector, as used for concealing exposed female (groove) connectors is shown. The grove-cap sections are T-shaped so as to be able to cap exposed groove connections where desired. Such applications include, for example: "Fascia" along roof edges; Tops of low walls on terraces and balconies; and Tops of parapet walls on roofs. The groove-cap section, by construction, has a male (tongue) connector on one side at a 90 degree angle from such side.

Figure 21:
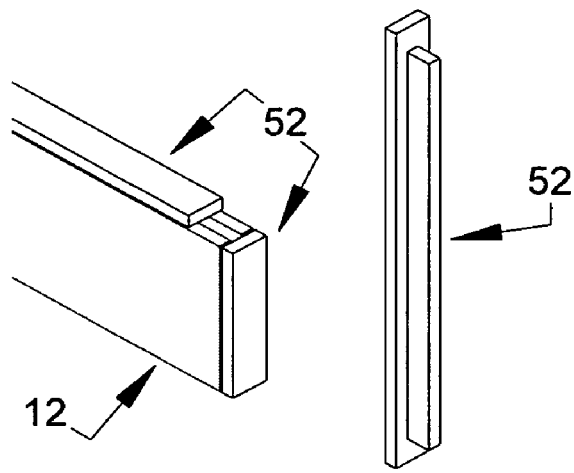
Figure 21:
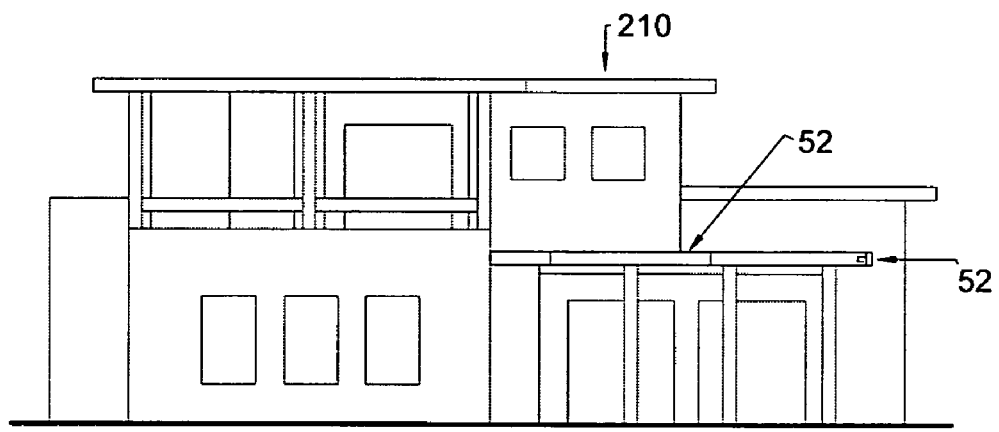
Figure 21:
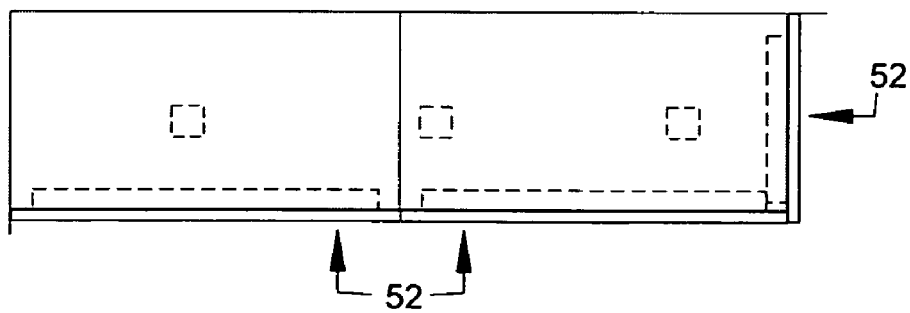
Figure 22:
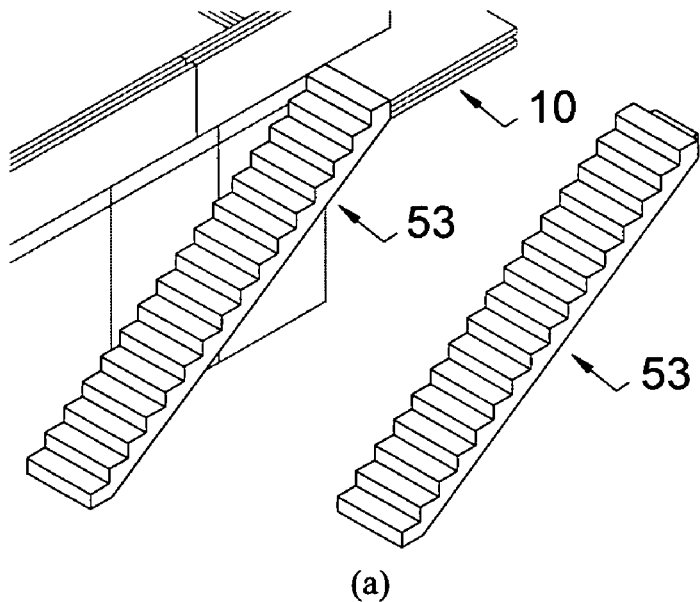
Figure 22:
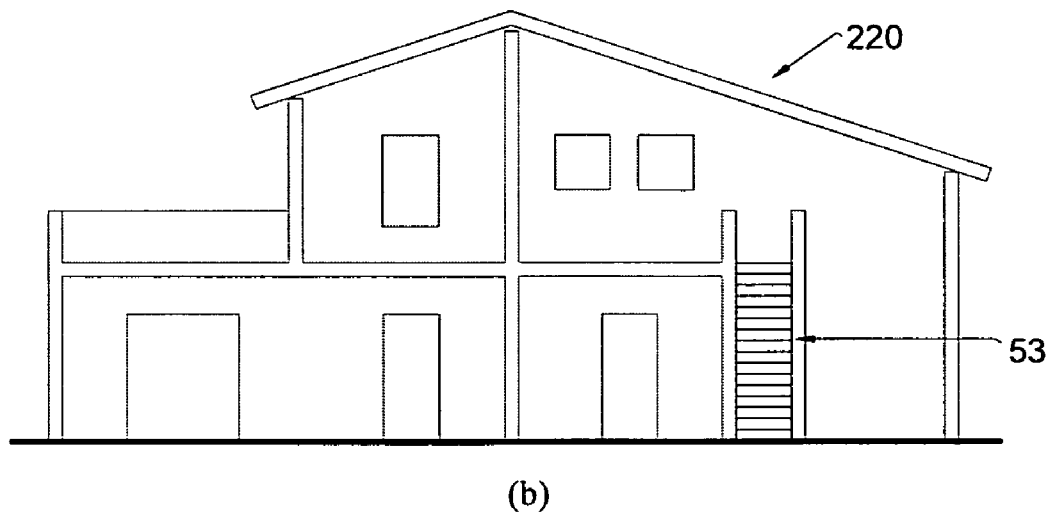
Figure 22:
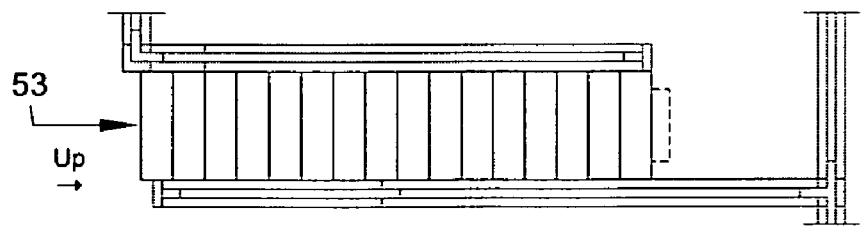

Referring now to FIGS. 21(a), 21(b) and 21(c), an example application, an exterior elevation view and a plan view, respectively, of example applications of groove-cap section 52 are shown. In FIG. 21 (a), a groove-cap section 52 is shown inserted onto a female connector of panel sections 12. In FIG. 21(b), a scale model 210 has two groove-cap sections 52 being utilized in its construction. In FIG. 21 (c), a number of groove-cap sections 52 are shown interconnected with the other system pieces.

Referring back specifically to FIGS. 5($c_1$) and 5($c_2$), a modular one-flight staircase 53, having a male connector at the top, with 15 steps plus bottom landing is shown. A modular one-flight staircase 53 can be utilized in a 2-story or higher houses to connect one level to another. The male (tongue) connector at the connection point at the top landing connects to a groove (Female) connector of a Floor panel section (not shown).

Referring now to FIGS. 22(a), 22(b) and 22(c), an example application, an exterior elevation view and a plan view, respectively, of example applications of staircase 53 are shown. In FIG. 22(a), a staircase 53 is shown with a male connector inserted into a female connector of a Floor panel section 10 to create a staircase leading between two floors. In FIG. 22(b), a scale model 220 has a staircase 53 being utilized in its construction to connect two separate floors of the model. In FIG. 22(c), the staircase 53 is shown interconnected with the other system pieces.

Thus, as can be seen from the above description of the present invention with reference to the accompanying drawings, each of the pieces in the building block architectural design aid system are designed in a manner that allows each to be used for more than one purpose, with the resulting purpose depending on how the user chooses to apply and orientate the part. For example, a 0.5" wide×2.25" high×0.1875" thick "full-height solid wall" section (1:48 Architectural scale=2'×9'×9") turned 90 degrees is transformed into a 2.25" wide×0.5" high×0.1875" thick (1:48 Architectural scale=9'×2'×9") "knee-wall" or "header" section. The same part oriented horizontally (laying flat) is transformed into a "floor/ceiling" or "roof" section. This intended versatility of each part provides the user with the ability to construct a model with relatively little limitation on custom design capabilities with a relatively small variety of part shapes.

Accordingly, the design of the parts and the total sum of the parts provide the ability for the user to create an architectural scale model at 1:48 scale based on a unique or existing house design and can easily accommodate 5,000 square feet of floor space, with one or more levels, 9-foot or higher ceiling heights, and with a sloped 4-pitch roof or a flat roof. Depending on the level of skill and imagination of the user, the models created with the invention can conceptually portray visual outline impressions of most existing architectural styles to a similar extent that a professional architect's model typically portrays such an impression.

The invention's building block system is designed to contain enough parts with versatile applications for each to build a scale model based on a house design with up to 5,000 square feet of floor space with one or more levels. Because the system provides easy changeability during the model construction process, and is also reusable, the invention allows the user to adjust and refine the design of their dream-house as they shape the physical three-dimensional scale model of their vision.

In addition to the classifications and construction of the differing pieces of the scale model building block system, the present invention may be featured with supportive components to both instruct and facilitate the user's interaction with the block system. For instance, a Work Pad, Architectural Scale Ruler, and Tutorial/Instructional Manual may be utilized to aid in the architectural design process.

The first additional feature, the Work Pad is designed as a 16"×20" plastic pad printed with a 4 squares-per-inch grid. This component provides a 1:48 scale grid to visually facilitate placing the upright wall sections with the desired layouts and room dimensions before connecting them.

The second additional feature, the Architectural Scale Ruler is designed as a 12" plastic ruler with two relevant scales to provide a quick method for the user to measure the parts and spaces: 1) Architectural—¼"=1'-0"; and 2) Standard—1"=1".

The third additional feature, the Tutorial/Instructional Manual is a printed and spiral-bound manual with instructions and tutorials. Such instructions and tutorials educate the user as to the system pieces and provide guidance in the architectural process.

Accordingly, the scale model building block classification system and the additional features serve to act as an architectural design aid system that allows for both the professional architect and the home design enthusiast to create, plan and modify architectural plans and buildings in an easy to use and understand three-dimensional manner that has here-to-for not been seen or used.

In the foregoing description, the method and apparatus of the present invention have been described with reference to a specific example(s). It is to be understood and expected that variations in the principles of the method and apparatus herein disclosed may be made by one skilled in the art and it is intended that such modifications, changes, and substitutions are to be included within the scope of the present invention as set forth in the appended claims. The specification and the drawings are accordingly to be regarded in an illustrative rather than in a restrictive sense.

What is claimed is:

1. An apparatus for an architectural design aid system, the apparatus comprising:
   a plurality of panels pieces, each panels piece having:
      at least one of a dimension in length of 0.375", 0.5", 0.75", 1", 1.5", 2" and 3",
      at least one of a dimension in height of 0.5", 0.75" and 2.25", and
      a depth ranging from 0.1875" to 0.19";
   a plurality of openings pieces, each openings piece having:
      a length of 1.5",
      a height of 2.25", and
      a depth ranging from 0.1875" to 0.19";
   a plurality of inserts pieces, each inserts piece having:
      at least one of a dimension in length of 0.75", 1.5" and 2",
      at least one of a dimension in height of 0.5" and 0.75", and
      a depth ranging from 0.1875" to 0.19";
   a plurality of connectors pieces, each connectors piece having
      at least one of a dimension in length of 0.19" and 0.25",
      at least one of a dimension in height of 0.19", 0.5", 0.75", 1.25", 2" and 2.25", and
      a depth of 0.063 and 0.19; and
   a plurality of details pieces,
   wherein in each panels piece, openings piece and inserts piece
      a groove runs a length and a width of each connectable side of the piece and
      a tongue runs a length and a width of each connectable side of the piece when inserted therein and stops a short distance from each end, and
   wherein the five distinct pieces snap fit together by insertion of the tongue on the connectable side of one piece into the groove on the connectable side of another piece, and
   wherein the snap fit is provided by the precise fit of the dimensions of the tongue into the dimensions of the groove, which snap fit allows for creation of a multi-level architectural scale model.

2. The apparatus according to claim 1, wherein the precise snap fit provides a flush surface between the two pieces connected together.

3. The apparatus according to claim 1, wherein the precise snap fit is via an interlocking of the tongue and the groove.

4. The apparatus according to claim 1, wherein the architectural scale model is three-dimensional.

5. The apparatus according to claim 1, wherein the five distinct pieces are manufactured as injection-molded solid plastic pieces.

6. The apparatus according to claim 1, wherein the plurality of panels pieces comprise:
   at least one of a rectangular solid panel and a triangular solid panel, each with no openings or cutouts.

7. The apparatus according to claim 1, wherein the plurality of panels pieces are applied in the scale model as wall, gable, floor, or roof sections.

8. The apparatus according to claim 1, wherein the plurality of openings pieces comprise:
   a rectangular panel with an opening.

9. The apparatus according to claim 1, wherein the plurality of openings pieces are applied as wall sections with door openings or window cutouts, or roof sections with skylight cutouts.

10. The apparatus according to claim 1, wherein the plurality of inserts pieces comprise solid rectangular panels.

11. The apparatus according to claim 1, wherein the plurality of inserts pieces are inserted into openings pieces as knee-walls to transform fixed doorway cutouts into windows or skylights, or connected adjacent to solid wall sections as headers and/or knee-walls to create custom door and window openings.

12. The apparatus according to claim 1, wherein the plurality of connectors pieces comprise connection pieces.

13. The apparatus according to claim 1, wherein the plurality of connectors pieces are applied as intersections either horizontally or vertically where two or more walls, floors or roofs intersect at different or same angles.

14. The apparatus according to claim 1, wherein the plurality of details pieces comprise additional pieces comprising staircases, columns, railings and mullions.

15. The apparatus according to claim 1, wherein the five distinct classes of the pieces provide the ability for a user to create an architectural scale model at 1:48 scale based on a unique or existing house design.

* * * * *